United States Patent [19]
Nakamura et al.

[11] Patent Number: 6,050,888
[45] Date of Patent: *Apr. 18, 2000

[54] METHOD AND APPARATUS FOR MANUFACTURING CHAIN-LIKE FOOD PRODUCTS SUCH AS SAUSAGES OR THE LIKE

[75] Inventors: Minoru Nakamura, Tokyo; Minoru Kasai, Ebina, both of Japan

[73] Assignee: Hitech Co. Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/061,277

[22] Filed: Apr. 17, 1998

Related U.S. Application Data

[63] Continuation-in-part of application No. 08/640,279, Apr. 30, 1996, Pat. No. 5,788,563.

[30] Foreign Application Priority Data

| Jan. 31, 1996 | [JP] | Japan | 8-35702 |
| Jan. 31, 1997 | [JP] | Japan | 9-35751 |

[51] Int. Cl.[7] .................................................. A22C 11/00
[52] U.S. Cl. ............................................ 452/47; 452/48
[58] Field of Search ............................. 452/47, 48, 46

[56] References Cited

U.S. PATENT DOCUMENTS

| 1,366,133 | 1/1921 | Hottmann . |
| 3,694,853 | 10/1972 | Greider . |
| 3,835,503 | 9/1974 | Townsend et al. . |
| 3,868,747 | 3/1975 | Townsend . |
| 3,873,744 | 3/1975 | Townsend et al. . |
| 3,952,370 | 4/1976 | Greider . |
| 4,112,546 | 9/1978 | Muller . |
| 4,129,923 | 12/1978 | Hoegger . |
| 4,539,796 | 9/1985 | Nakamura et al. . |
| 4,570,301 | 2/1986 | Beckman et al. ................... 452/46 |
| 4,614,005 | 9/1986 | Townsend . |
| 4,671,042 | 6/1987 | Moekle et al. . |
| 4,766,645 | 8/1988 | Lamartino et al. . |
| 4,847,951 | 7/1989 | Kollross ............................... 452/48 |
| 5,019,012 | 5/1991 | Townsend et al. ................. 452/46 |
| 5,049,108 | 9/1991 | Staudenrausch . |
| 5,480,346 | 1/1996 | Kasai et al. . |

FOREIGN PATENT DOCUMENTS

| 2 342 663 | 3/1977 | France . |
| 46-33916 | 11/1971 | Japan . |
| 49-101577 | 9/1974 | Japan . |
| 50-91489 | 7/1975 | Japan . |
| 1-13329 | 3/1989 | Japan . |
| 1 534 239 | 11/1978 | United Kingdom . |

*Primary Examiner*—Willis Little
*Attorney, Agent, or Firm*—Nixon & Vanderhye

[57] ABSTRACT

An apparatus for manufacturing chain-like food products such as sausages or the like includes a stuffing nozzle over which a natural intestine is fitted and a pinching device for pinching and conveying a stuffed natural intestine in the forward direction of the stuffing nozzle. A stuffing material is discharged from a distal end of the stuffing nozzle into a straightened natural intestine portion of the natural intestine to form a stuffed natural intestine portion. The stuffed natural intestine portion is nipped, and is pulled. The stuffed natural intestine portion being rotated and moved is pinched to form a twist. The discharge of the stuffing material into the straightened natural intestine portion is effected while the stuffed natural intestine portion and the straightened natural intestine portion are being moved.

30 Claims, 18 Drawing Sheets

III-III SECTIONAL VIEW OF Fig.1

II-II SECTIONAL VIEW OF Fig.1

I-I SECTIONAL VIEW OF Fig.1

IV-IV SECTIONAL VIEW OF (A)

V-V SECTIONAL VIEW OF (B)

VI-VI SECTIONAL VIEW OF (C)

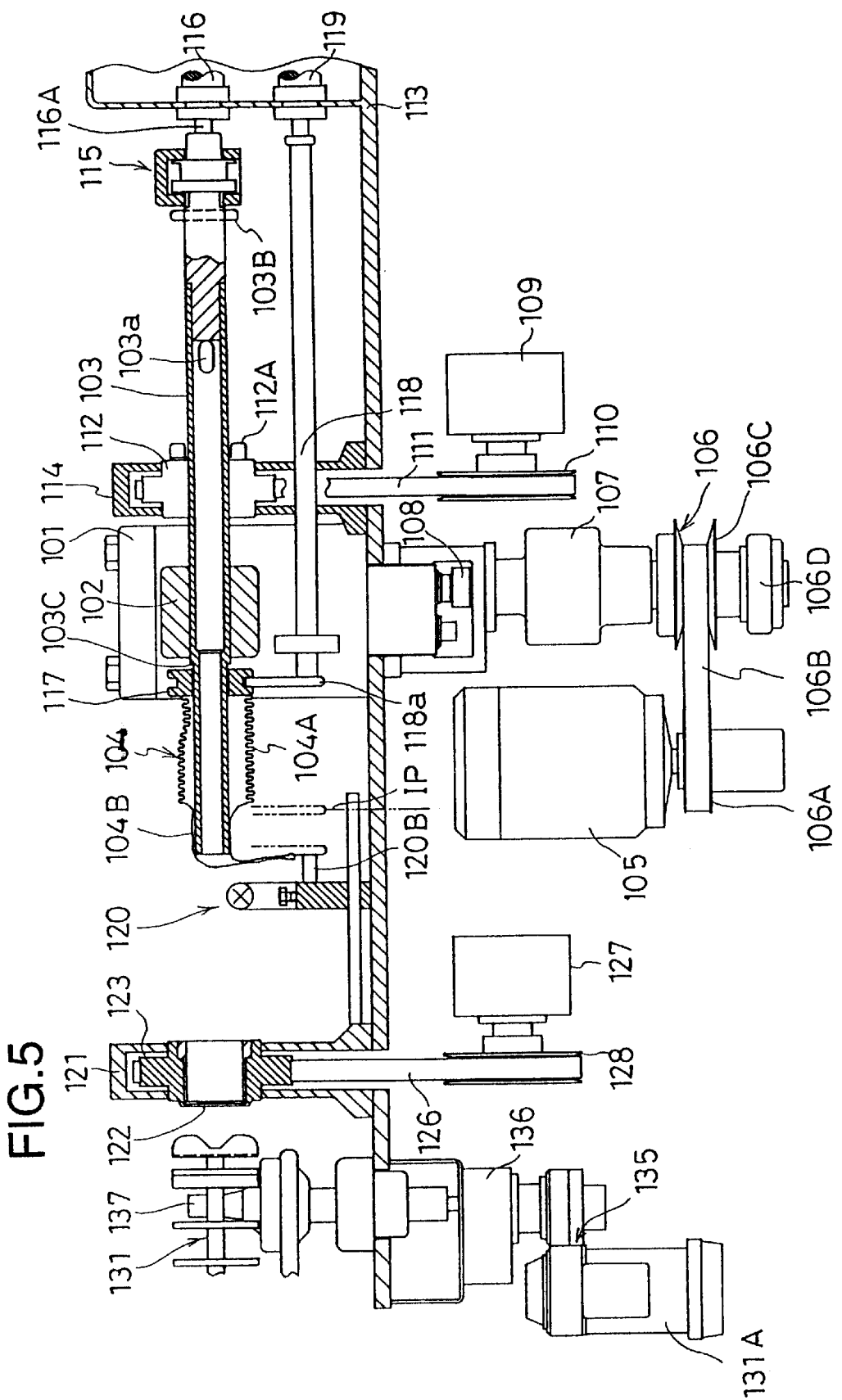

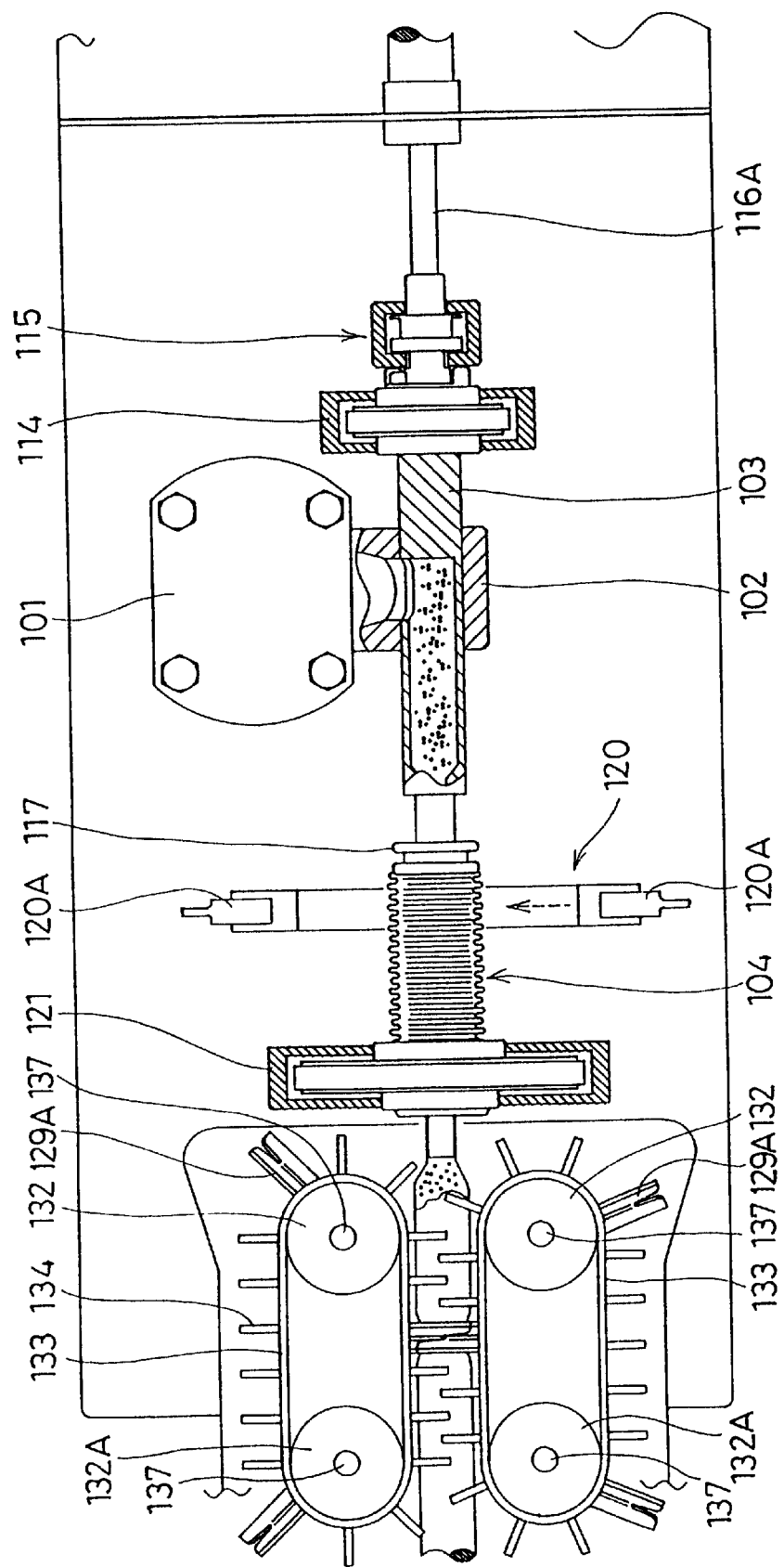

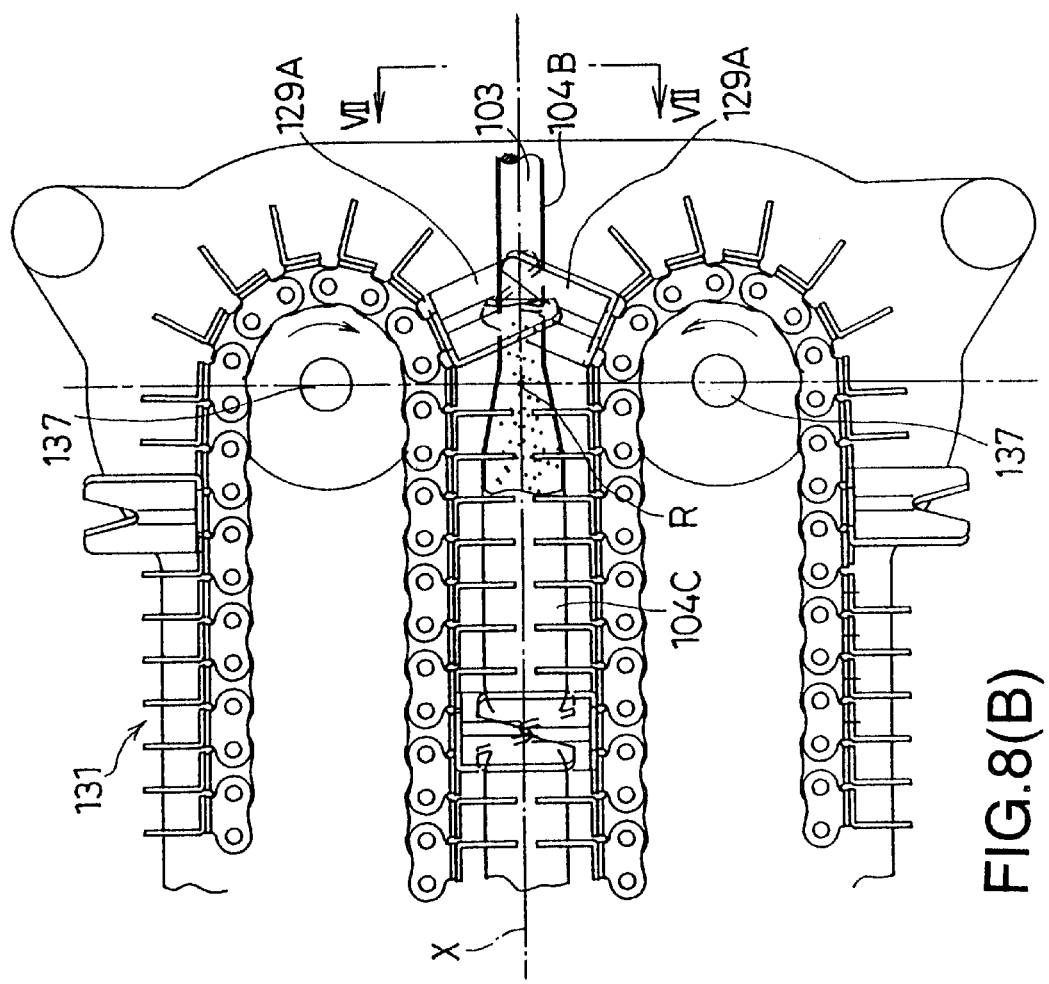
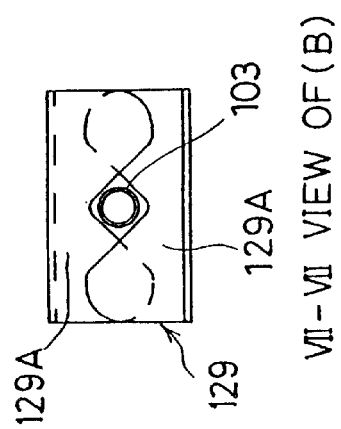
FIG.8(A)
FIG.8(B)

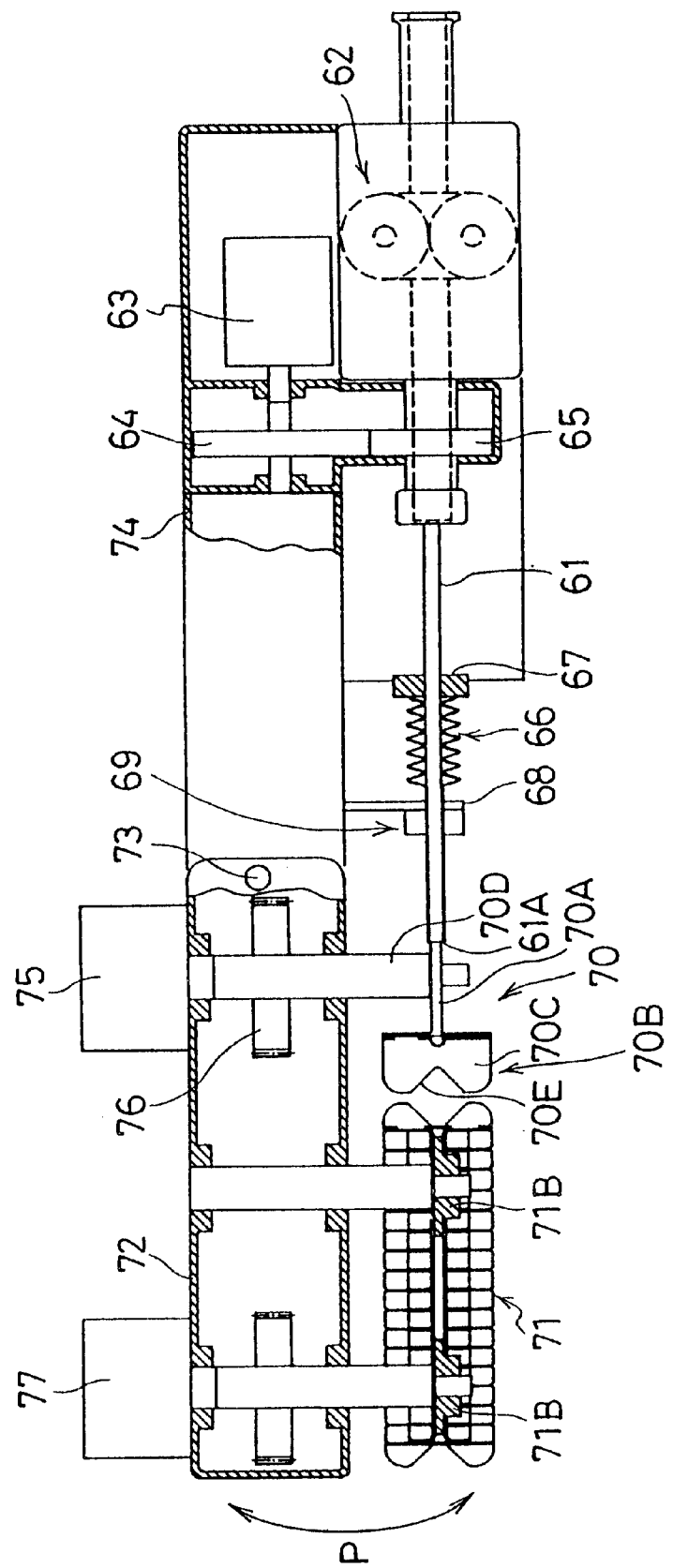

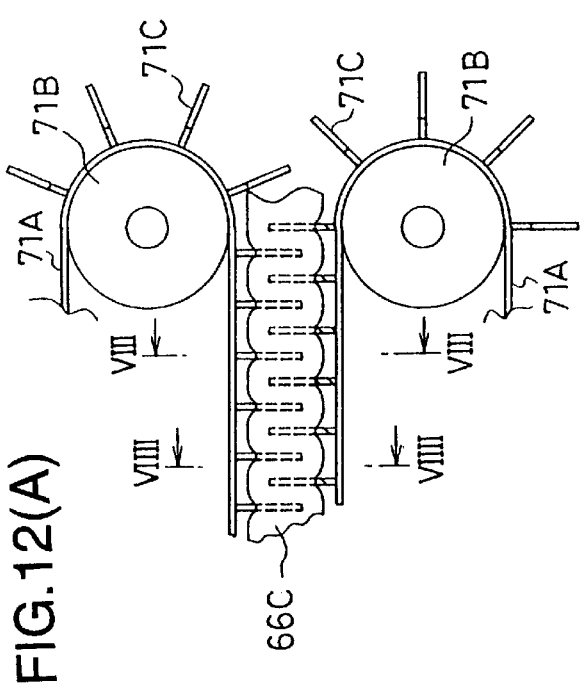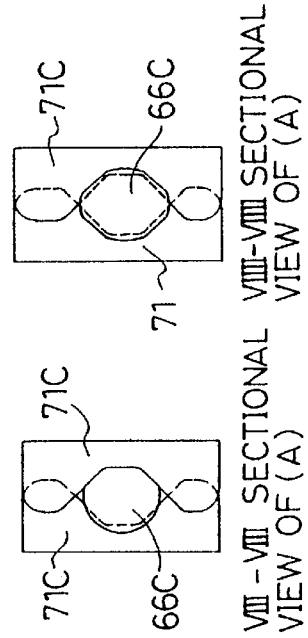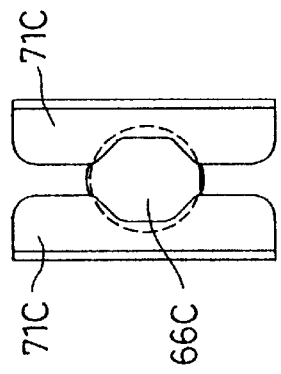

METHOD AND APPARATUS FOR MANUFACTURING CHAIN-LIKE FOOD PRODUCTS SUCH AS SAUSAGES OR THE LIKE

This application is a continuation in part of Ser. No. 08/640,279 filed Apr. 30, 1996 now U.S. Pat. No. 5,788,563.

BACKGROUND OF THE INVENTION

1. Field of the Invention

The present invention relates to a method and an apparatus for manufacturing chain-like food products such as sausages or the like by using natural intestines.

2. Description of the Related Art

Conventional chain-like sausage products are manufactured by stuffing an animal's gut, that is, a natural intestine such as a sheep's gut or a hog's gut, or an artificial casing such as a cellulose casing or a collagen casing, with a stuffing material.

In this case, there are frequent occasions when the manufacturing method and apparatus differ between the case in which a natural intestine is used as the casing and the case in which an artificial casing is used.

Namely, since the natural intestine is liable to be broken when it is stuffed with the stuffing material or when the stuffed natural intestine is linked, the method and the apparatus using the natural intestine are difficult to put to practical use unless various measures are provided.

Such a problem becomes more conspicuous in the case of a so-called high-speed stuffing apparatus in which the natural intestine is stuffed with a stuffing material and is pinched.

Apparatuses for manufacturing chain-like natural-intestine sausages, which are each comprised of an endless conveyor provided with pinchers at predetermined intervals as well as a rotating stuffing nozzle, are publicly known through Japanese Patent Application Laid-Open Nos. 49-101577 and 50-91489 (No. 50-91489 corresponds to U.S. Pat. No. 3,873,744.

In these known manufacturing apparatuses, the natural intestine fitted over the stuffing nozzle is rotated together with the rotating stuffing nozzle by increasing a frictional force acting in the rotating direction between the rotating stuffing nozzle and the natural intestine.

However, in these conventional techniques, since the natural intestine is locally engaged with the rotating stuffing nozzle or a fin head attached to a vicinity of a distal end of the rotating stuffing nozzle, there are cases where slippage occurs between the natural intestine and the rotating stuffing nozzle or fin head. Further, since the force from the rotating stuffing nozzle or the fin head is concentrated on parts of the natural intestine, breakage of the natural intestine is liable to occur when the intestine is pulled out from the rotating stuffing nozzle or the fin head.

In addition, in the manufacture of natural-intestine sausages, the membrane of the natural intestine is thin and very soft, and does not have a high shape-retaining property, and the rigidity of the stuffed natural intestine which is stuffed with the sausage material is small, with the result that a twist is liable to occur in the stuffed natural intestine at positions other than those where the stuffed natural intestine is pinched. In Japanese Patent Application Laid-Open No. 49-101571, an arrangement is provided such that after tie stuffed natural intestine is pinched by the pinchers, tie stuffing nozzle is rotated so as to allow a twist to be reliably produced at the pinched portion. In this case, since the stuffing nozzle rotates intermittently, and the stuffing nozzle is stopped except during the step of pinching by the pinchers, the problem that the position of a twist produced in the stuffed natural intestine is not fixed is unlikely to occur. However, since the stuffing nozzle is rotated intermittently, the rotation of the stuffing nozzle is sometimes difficult to be imparted to the natural intestine over the stuffing nozzle, so that there is the risk that a required number of twists cannot be imparted to the pinched portion. Furthermore, there are additional drawbacks in that the intermittently rotating-type stuffing nozzle, which rotates at high speed, is liable to undergo run out in the rotation of the stuffing nozzle, and lacks the durability of the apparatus.

In the sausage manufacturing apparatus disclosed in Japanese Patent Application Laid-Open No. 50-91489, a fin head, which has a hollow cylindrical portion and fins provided in such a manner as to project radially from an outer periphery of the hollow cylindrical portion, is detachably provided on the stuffing nozzle. Since the fin head expands the diameter of the natural intestine stretched from the inner side thereof, and is discontinuously and locally engaged with the stretched intestine, the twisting rigidity of the natural intestine is very low. For this reason, the rotation of the fin head is difficult to be imparted to the stuffed natural intestine portion via the stretched natural intestine portion. Since the stuffing nozzle rotates continuously, a twist can possibly occur not at the portion pinched by the pinchers but at a position located in front of and in proximity to a discharge end of the fin head.

Further, since this fin head is larger than the inside diameter of the natural intestine, when the natural intestine is fitted over the stuffing nozzle, the fin head must be removed from the stuffing nozzle, which is very inferior in the operating efficiency. In addition to it, as these prior arts are aimed at using either natural intestines or artificial casings, the technical subject is yet to be solved as to how to have the same stuffed diameter while using natural intestines with nonuniform diameter.

SUMMARY OF THE INVENTION

Accordingly, the preset invention is aimed at providing a method and an apparatus for manufacturing, using exclusively natural intestines, chain-like food products such as sausages or the like which achieve the following objects and are capable of overcoming the drawbacks of the above-described conventional methods and apparatuses for manufacturing sausages or the like.

Specifically, a primary object of the present invention is to provide a method and an apparatus for manufacturing chain-like rood products such as sausages or the like which permit high-speed production of novel natural-intestine sausage products which are substantially fixed in the length, the stuffed diameter, the stuffed weight, and the stuffed tension and which have good shapes even if a natural intestine having an nonuniform diameter is used as a casing.

A secondary object of the present invention is to provide a method and an apparatus for manufacturing chain-like food products such as sausages or the like which make it possible to reliably impart the rotation of the stuffing nozzle to a straightened natural intestine portion fitted over the stuffing nozzle.

A third object of the present invention is to provide a method and an apparatus for manufacturing chain-like food products such as sausages or the like which make it possible to produce a twist only at the position in the stuffed natural intestine pinched by pinchers.

A fourth object of the present invention is to provide a method and an apparatus for manufacturing chain-like food products such as sausages or the like which make it possible to prevent breakage of the natural intestine or an untwisting at the pinched portion.

A fifth object of the present invention is to provide a method and an apparatus for manufacturing chain-like food products such as sausages or the like which excel in the stuffing work efficiency.

In accordance with a first aspect of the present invention, there is provided a method for manufacturing chain-like food products such as sausages or the like, comprising the steps of: pinching a stuffed natural intestine portion; pulling the stuffed natural intestine portion so as to reduce the diameter of an inner peripheral surface of an unstuffed straightened natural intestine portion following the stuffed natural intestine portion; and supplying a stuffing material into the unstuffed straightened natural intestine portion to form the stuffed natural intestine portion, holding in a cylindrical shape the inner peripheral surface of the unstuffed straightened natural intestine portion with the diameter thereof reduced, imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and forming a twist at a pinched position of the stuffed natural intestine portion.

In accordance with a second aspect of the present invention, there is provided an apparatus for manufacturing chain-like food products such as sausages or the like, comprising: means for pinching a stuffed natural intestine portion and pulling the stuffed natural intestine portion so as to reduce the diameter of an inner peripheral surface of an unstuffed straightened natural intestine portion following the stuffed natural intestine portion; and means for supplying a stuffing material into the unstuffed straightened natural intestine portion to form the stuffed natural intestine portion, for holding in a cylindrical shape the inner peripheral surface of the unstuffed straightened natural intestine portion with the diameter thereof reduced, for imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and for forming a twist at a pinched position of the stuffed natural intestine portion.

In accordance with a third aspect of the present invention, there is provided a method for manufacturing chain-like food products such as sausages or the like, comprising the steps of: discharging a stuffing material from a distal end of a stuffing nozzle into a straightened natural intestine portion to form a stuffed natural intestine portion forwardly of the distal end of the stuffing nozzle; pulling the stuffed natural intestine portion by moving the stuffed natural intestine portion forwardly of the distal end of the stuffing nozzle to reduce the diameter of an ensuing straightened natural intestine portion so as to cause the straightened natural intestine portion to come into contact with an outer periphery of the stuffing nozzle, and rotating the stuffing nozzle with which the straightened natural intestine portion is brought into contact, so as to rotate the stuffed natural intestine portion; and pinching the stuffed natural intestine portion and forming a twist at a pinched position thereof, wherein the discharge of the stuffing material into the straightened natural intestine portion is effected while the stuffed natural intestine portion and the straightened natural intestine portion are being moved.

In accordance with a fourth aspect of the present invention, there is provided an apparatus for manufacturing chain-like food products such as sausages or the like, comprising: a stuffing nozzle for forming a stuffed natural intestine portion forwardly of a distal end of the stuffing nozzle by discharging a stuffing material from the distal end of the stuffing nozzle into a straightened natural intestine portion; and means for pulling the stuffed natural intestine portion forwardly of the distal end of the stuffing nozzle to reduce the diameter of an ensuing straightened natural intestine portion so as to cause the straightened natural intestine portion to come into contact with an outer periphery of the stuffing nozzle, for rotating the stuffing nozzle with which the straightened natural intestine portion is brought into contact, so as to rotate the stuffed natural intestine portion, and for pinching the stuffed natural intestine portion so as to form a twist therein.

In accordance with a fifth aspect of the present invention, there is provided an apparatus for manufacturing chain-like food products such as sausages or the like, comprising: a rotatable stuffing nozzle over which a natural intestine sectioned into a straightened natural intestine portion and a shirred natural intestine portion is fitted, the stuffing nozzle being capable of stuffing an interior of the straightened natural intestine portion with a stuffing material; a pinching device having a pincher for pinching the stuffed natural intestine portion stuffed with the stuffing material by the stuffing nozzle and moving means for moving the pincher, so as to reduce the diameter of the straightened natural intestine portion fitted over the stuffing nozzle as the stuffed natural intestine portion is pulled by the pincher; and nozzle rotating means for rotating the stuffing nozzle with which the straightened natural intestine portion with its diameter reduced is brought into contact, so as to rotate the stuffed natural intestine portion and impart a twist to a pinched portion of the stuffed natural intestine portion pinched by the pincher.

In accordance with a sixth aspect of the present invention, in the apparatus for manufacturing chain-like food products such as sausages or the like according to the fifth aspect of the present invention, the pincher consists of a pair of pincher members, and a center of movement of the pair of pincher members is located laterally of an extension of an axis of the stuffing nozzle such that the pair of pincher members moves from a rearward region located rearwardly of a distal end of the stuffing nozzle toward a forward region located forwardly thereof.

In accordance with a seventh aspect of the present invention, there is provided an apparatus for manufacturing chain-like food products such as sausages or the like, comprising: a rotatable stuffing nozzle over which a natural intestine sectioned into a straightened natural intestine portion and a shirred natural intestine portion is fitted, the stuffing nozzle being capable of stuffing an interior of the straightened natural intestine portion with a stuffing material; a conveying device for conveying at a predetermined speed the stuffed natural intestine portion stuffed with the stuffing material by the stuffing nozzle while nipping the stuffed natural intestine, for pulling the straightened natural intestine portion being pulled out from the stuffing nozzle by the conveyance, so as to reduce the diameter of the straightened natural intestine portion and cause the straightened natural intestine portion to be brought into contact with an outer periphery of the stuffing nozzle; a pinching device having a pincher for pinching the stuffed natural intestine portion and moving means for moving the pincher, and nozzle rotating means for rotating the stuffing nozzle with which the straightened natural intestine portion with its diameter reduced is brought into contact, so as to rotate the stuffed natural intestine portion and impart a twist to a pinched portion of the stuffed natural intestine portion pinched by the pincher.

In accordance with an eighth aspect of the present invention, in the apparatus for manufacturing chain-like food products such as sausages or the like according to the seventh aspect of the present invention, the pincher consists of a pair of pincher members, and a center of movement of the pair of pincher members is located laterally of an extension of an axis of the stuffing nozzle such that the pair of pincher members moves from a rearward region located rearwardly of a distal end on the stuffing nozzle toward a forward region located forwardly thereof.

In accordance with a ninth aspect of the present invention, the apparatus for manufacturing chain-like food products such as sausages or the like according to any one of the fourth, fifth, and seventh aspects of the present invention further comprises: an engaging member through which the stuffing nozzle is inserted and which engages the natural intestine which is fitted over the stuffing nozzle.

In accordance with a 10th aspect of the present invention, the apparatus for manufacturing chain-like food products such as sausages or the like according to the ninth aspect of the present invention further comprises: a rotatively driving mechanism for rotating the engaging member about an axis of the stuffing nozzle.

In accordance with an 11th aspect of the present invention, the apparatus for manufacturing chain-like food products such as sausages or the like according to the fifth or seventh aspect of the present invention further comprises: a natural-intestine pushing member for pushing the shirred natural intestine portion fitted over the stuffing nozzle toward the distal end of the stuffing nozzle, so as to reduce the length of the straightened natural intestine portion.

In accordance with a 12th aspect of the present invention, in the apparatus for manufacturing chain-like food products such as sausages or the like according to the 11th aspect of the present invention, the pushing of the shirred natural intestine portion by the natural-intestine pushing member is effected in steps.

In accordance with a 13th aspect of the present invention, in the apparatus for manufacturing chain-like food products such as sausages or the like according to the any one of the fifth to eighth aspects of the present invention, the pincher has a pair of pincher members which are provided symmetrically about an extension of the axis of the stuffing nozzle, and the moving means is adapted to move each of the pincher members.

In accordance with a 14th aspect of the present invention, in the apparatus for manufacturing chain-like food products such as sausages or the like according to the fifth or sixth aspect of the present invention, the pincher has a pair of pincher members which are capable of opening and closing and are provided laterally of an extension of the axis of the stuffing nozzle, and the pair of pincher members are provided on the moving means.

In accordance with a 15th aspect of the present invention, the apparatus for manufacturing chain-like food products such as sausages or the like according to the fifth or seventh aspect of the present invention further comprises: a stuffing pump for supplying the stuffing material into the stuffing nozzle; a stuffing-pump driving mechanism for driving the stuffing pump and having speed changing means for changing a pumping speed of the stuffing pump; and a pinching-device driving mechanism for driving the pinching device and having speed changing means for changing a moving speed of the pincher.

In accordance with a 16th aspect of the present invention, in the apparatus for manufacturing chain-like food products such as sausages or the like according to the fifth or seventh aspect of the present invention, the nozzle rotating means has speed changing means for changing a nozzle rotating speed.

In accordance with a 17th aspect of the present invention, the apparatus for manufacturing chain-like food products such as sausages or the like according to the fifth or seventh aspect of the present invention further comprises: a stuffing pump for supplying the stuffing material into the stuffing nozzle; a motor for driving the stuffing pump; and a motor for driving the pinching device, wherein the nozzle rotating means has a motor for rotating the stuffing nozzle, and the motor for driving the stuffing pump, the motor for rotating the stuffing nozzle, and the motor for driving the pinching device are respectively independently provided.

In accordance with an 18th aspect of the present invention, in the apparatus for manufacturing chain-like food products such as sausages or the like according to the 17th aspect of the present invention, a pumping speed of the stuffing pump, a rotating speed of the stuffing nozzle, and a pincher moving speed of the pinching device are respectively independently changeable.

In accordance with a 19th aspect of the present invention, the apparatus for manufacturing chain-like food products such as sausages or the like according to the fifth or seventh aspect of the present invention further comprises: a stuffing pump for supplying the stuffing material into the stuffing nozzle; a motor for driving the stuffing pump; an engaging member through which the stuffing nozzle is inserted and which engages the natural intestine fitted over the stuffing nozzle; a motor for rotating the engaging member; and a motor for driving the pinching device, wherein the motor for driving the stuffing pump, the motor for rotating the engaging member, and the rotor for driving the pinching device are respectively independently provided.

In accordance with a 20th aspect of the present invention, in the apparatus for manufacturing chain-like food products such as sausages or the like according to the 19th aspect of the present invention, a pumping speed of the stuffing pump, a rotating speed of the engaging member, and a pincher moving speed of the pinching device are respectively independently changeable.

In accordance with a 21th aspect of the present invention, the apparatus for manufacturing chain-like food products such as sausages or the like according to the fifth or seventh aspect of the present invention further comprises: detecting means for detecting a change in a shape of the shirred natural intestine portion; a stuffing pump for supplying the stuffing material into the stuffing nozzle; and a stuffing-pump driving mechanism for driving the stuffing pump, wherein the stuffing-pump driving mechanism is adapted to stop the driving of the stuffing pump by means of a signal from the detecting means.

In accordance with a 22nd aspect of the present invention, there is provided a method for manufacturing chain-like food products such as sausages or the like, comprising the steps of: sectioning a natural intestine fitted over a stuffing nozzle into a shirred natural intestine portion and a straightened natural intestine portion; discharging a stuffing material from a distal end of the stuffing nozzle into the straightened natural intestine portion to form a stuffed natural intestine portion forwardly of the distal end of the stuffing nozzle; and pinching the stuffed natural intestine portion, pulling the stuffed natural intestine portion by moving the stuffed natural intestine portion forwardly of the distal end of the stuffing nozzle via a pinched position of the stuffed natural intestine portion to reduce the diameter of the straightened natural intestine portion so as to cause the straightened natural intestine portion to come into contact with an outer periphery of the stuffing nozzle, rotating the stuffing nozzle with which the straightened natural intestine portion is brought into contact, so as to rotate the stuffed natural intestine portion, and forming a twist at a pinched position of the rotated stuffed natural intestine portion, wherein the discharge of the stuffing material into the straightened natural intestine portion is effected while the stuffed natural intestine portion and the straightened natural intestine portion are being moved.

In accordance with a 23rd aspect of the present invention, there is provided a method for manufacturing chain-like food products such as sausages or the like, comprising the steps of: sectioning a natural intestine fitted over a stuffing nozzle into a shirred natural intestine portion and a straightened natural intestine portion; discharging a stuffing material from a distal end of the stuffing nozzle into the straightened natural intestine portion to form a stuffed natural intestine portion forwardly of the distal end of the stuffing nozzle; nipping the stuffed natural intestine portion, pulling the stuffed natural intestine portion by moving the stuffed natural intestine portion forwardly of the distal end of the stuffing nozzle to reduce the diameter of the straightened natural intestine portion so as to cause the straightened natural intestine portion to come into contact with an outer periphery of the stuffing nozzle, rotating the stuffing nozzle with which the straightened natural intestine portion is brought into contact, so as to rotate the stuffed natural intestine portion; and pinching the stuffed natural intestine portion being rotated and moved and forming a twist therein, wherein the discharge of the stuffing material into the straightened natural intestine portion is effected while the stuffed natural intestine portion and the straightened natural intestine portion are being moved.

In accordance with a 24th aspect of the present invention, there is provided an apparatus for manufacturing chain-like food products such as sausages or the like, comprising: a stuffing nozzle over which a natural intestine is fitted and which is adapted to discharge a stuffing material into the natural intestine; means for conveying the stuffed natural intestine with the stuffing material stuffed therein in a forward direction of the stuffing nozzle at a predetermined speed, and stretching the natural intestine by means of this conveyance so as to pull the natural intestine fitted over the stuffing nozzle; an engaging member having an engaging hole through which the stuffing nozzle is inserted and which engages an outer surface of the natural intestine fitted over the stuffing nozzle; pinching means having a pair of pincher members which are moved in such a manner as to pinch the stuffed natural intestine at predetermined periods; means for rotating the stuffing nozzle with which the natural intestine passed through the engaging hole of the engaging member has been brought into contact, so as to form a twist in a pinched portion of the stuffed natural intestine by rotating the stuffed natural intestine; and means for supplying the stuffing material into the stuffing nozzle so as to discharge the stuffing material into the natural intestine being pulled out from a distal end of the stuffing nozzle by the stuffed natural intestine being conveyed at the predetermined speed, wherein a distal end of each of the pincher members is disposed such that a center of movement thereof is located laterally of an axis of the stuffing nozzle, so that the pincher members move from a rearward region located rearwardly of the distal end of the stuffing nozzle to a forward region located forwardly thereof and pinch the stuffed natural intestine, and the engaging member is disposed such that a point of engagement between the braking member and the natural intestine on the stuffing nozzle is located rearwardly of a line perpendicular to the axis of the stuffing nozzle on a point of intersection between a center line of movement of the pincher member, which is parallel to the axis of the stuffing nozzle, and a circle of a path of movement of the distal end of the pincher member.

In accordance with a 25th aspect of the present invention, there is provided an apparatus for manufacturing chain-like food products such as sausages or the like, comprising: a stuffing nozzle over which a natural intestine is fitted and which is adapted to discharge a stuffing material into the natural intestine; means for conveying the stuffed natural intestine with the stuffing material stuffed therein in a forward direction of the stuffing nozzle at a predetermined speed, and stretching the natural intestine by means of this conveyance so as to pull the natural intestine fitted over the stuffing nozzle; an engaging member having an engaging hole through which the stuffing nozzle is inserted and which engages an outer surface of the natural intestine fitted over the stuffing nozzle; pinching means having a pair of pitcher members which are moved in such a manner as to pinch the stuffed natural intestine at predetermined periods; means for rotating the stuffing nozzle with which the natural intestine passed through the engaging hole of the engaging member has been brought into contact, so as to form a twist in a pinched portion of the stuffed natural intestine by rotating the stuffed natural intestine; and means for supplying the stuffing material into the stuffing nozzle so as to discharge the stuffing material into the natural intestine being pulled out from a distal end of the stuffing nozzle by the stuffed natural intestine being conveyed at the predetermined speed, wherein a distal end of each of the pincher members is disposed such that a center of movement thereof is located laterally of an axis of the stuffing nozzle, so that the pincher members move from a rearward region located rearwardly of the distal end of the stuffing nozzle to a forward region located forwardly thereof and pinch the stuffed natural intestine, and the engaging member is disposed such that a point of engagement between the braking member and the natural intestine on the stuffing nozzle is located forwardly of a line perpendicular to the axis of the stuffing nozzle on a point of intersection between a center line of movement of the pincher member, which is parallel to the axis of the stuffing nozzle, and a circle of a path of movement of the distal end of the pincher member.

In accordance with a 26th aspect of the present invention, in the apparatus for manufacturing chain-like food products such as sausages or the like according to the 24th or 25th aspect of the present invention, the engaging member has an engaging hole for engaging the outer surface of the natural intestine which moves by following and being pulled by the stuffed natural intestine being conveyed and whose diameter is reduced on the stuffing nozzle.

In accordance with the method and the apparatus for manufacturing chain-like food products such as sausages or the like which take advantage of expanding characteristics of a natural intestine, that is, an animal's gut, in accordance with the present invention, the following advantages are offered:

First, it is possible to manufacture at high speed natural intestine sausages in which variations in the stuffed diameter and the stuffed tension are small.

Second, it is possible to manufacture at high speed novel, substantially fixed-length, substantially fixed-volume products which have good shapes and in which variations in the stuffed diameter and the stuffed tension are small, although they are natural-intestine sausages.

Third, the need for selectively using natural intestines in which variations in the diameter are small is reduced, thereby making it possible to effect a reduction in the cost of natural intestines.

Fourth, since the straightened natural intestine portion rotates integrally with the stuffing nozzle, the straightened natural intestine portion is prevented from being excessively wound around the stuffing nozzle, thereby also reducing the breakage of the natural intestine.

Fifth, a twisted portion is formed reliably as the stuffed natural intestine is placed at the pincher, so that the defective rate of the products can be reduced, thereby improving the yield of intestines used.

Sixth, breakage due to squeezing the stuffed natural intestine is reduced when the stuffed natural intestine is pinched by the pincher.

Seventh, the rotation of the stuffing nozzle is transmitted reliably to the pinched portion of the stuffed natural intestine via the stuffed natural intestine and the stretched straightened natural intestine portion Accordingly, variations in the number of twists is reduced, and the unwinding of the twist is also reduced.

Eighth, since it is possible to use a stuffing nozzle whose diameter is smaller than the diameter of the shirred natural intestine portion, the fitting of the natural intestine over the stuffing nozzle is facilitated, thereby reducing the operating time.

The above and other objects, features and advantages of the present invention will become more apparent from the following detailed description of the invention when read in conjunction with the accompanying drawings.

BRIEF DESCRIPTION OF THE DRAWINGS

FIGS. 2A to 2C are diagrams illustrating partial structures of a stuffing device shown in FIG. 1, in which FIG. 2A is a detailed diagram of a pincher, FIG. 2B is a cross-sectional view illustrating a stuffing nozzle and a straightened natural intestine portion; and FIG. 2C is a cross-sectional view illustrating the stuffing nozzle and a shirred natural intestine portion;

FIG. 5 is partly cutaway front elevational view illustrating the method and the apparatus for manufacturing chain-like food products such as sausages or the like in accordance with another embodiment of the present invention;

FIG. 6 is a partly cutaway plan view of FIG. 5;

FIG. 8A is a cross-sectional view, taken in the direction of arrows VII—VII in FIG. 8B, of the stuffing nozzle with pinchers engaged with each other, illustrating the operation of the pinchers;

FIG. 8B is a plan view illustrating the operation of the pinchers;

FIG. 11 is a partly cutaway plan view of FIG. 10;

FIGS. 12A to 12E are diagrams illustrating the shape of the cross section of a stuffed natural intestine pinched by lugs;

DESCRIPTION OF THE PREFERRED EMBODIMENTS

Figure 1:
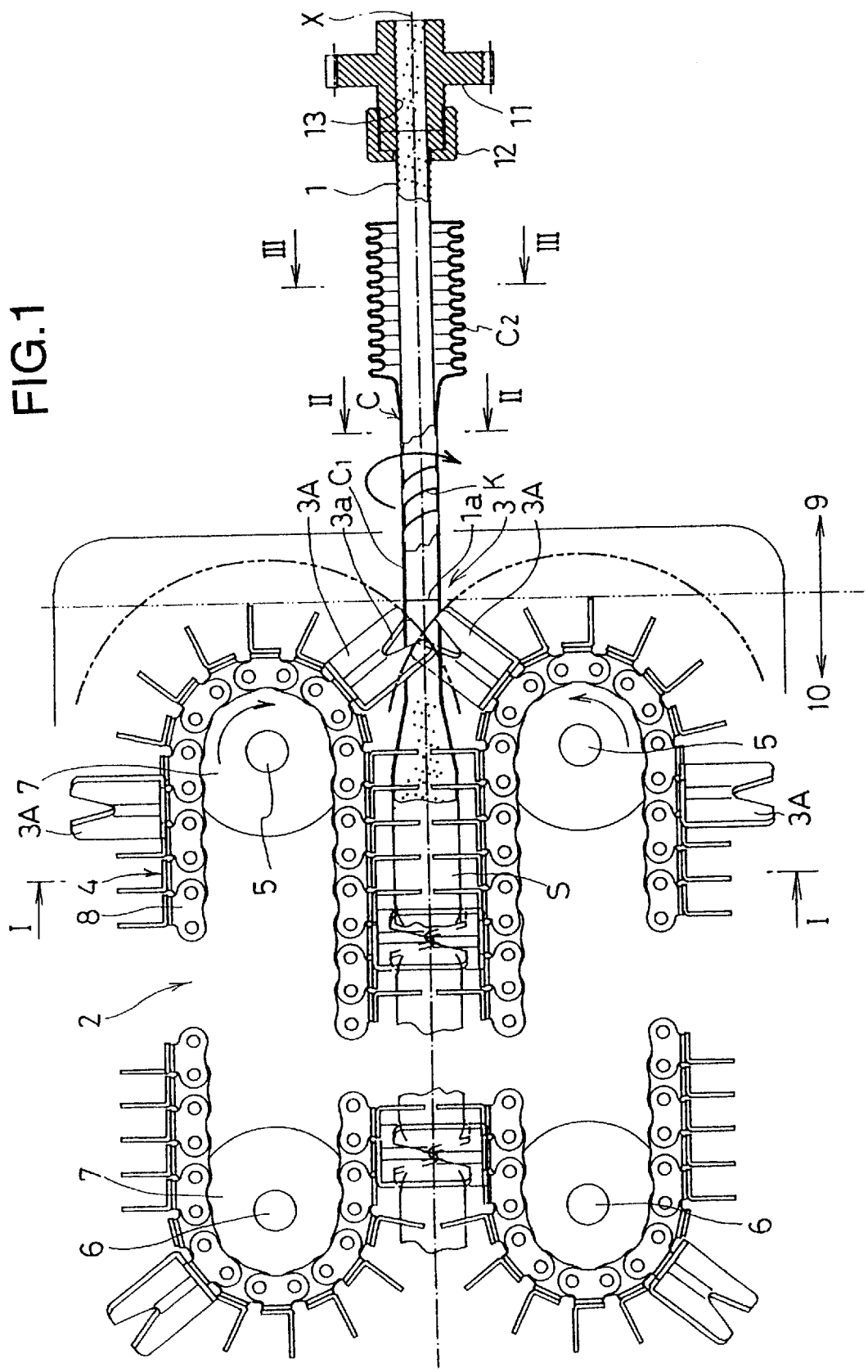
FIG. 1 is a partly cutaway plan view illustrating a method and an apparatus for manufacturing chain-like food products such as sausages or the like in accordance with an embodiment of the present invention.

Referring now to FIG. 1, a description will be given of an embodiment of the present invention.

Reference numeral 1 denotes a stuffing nozzle, and a natural intestine C, which is sectioned into a straightened natural intestine portion $C_1$ and a shirred natural intestine portion $C_2$, is fitted over the stuffing nozzle 1. The shirred natural intestine portion is a portion wherein the natural intestine is shirred in the longitudinal direction to be in a bellows shaped state. The straightened natural intestine portion is a portion wherein the natural intestine is straightened in the longitudinal direction to be in a straight state. The stuffing nozzle 1 receives a stuffing material fed out from a stuffing pump (not shown) for continuously supplying the stuffing material, and discharges the same from a distal end thereof.

The stuffing nozzle is provided in such a manner as to be capable of continuously rotating about an axis X, and has an identical cross section of a round pipe over the length of the stuffing nozzle.

Reference numeral 2 denotes a pinching device which pinches a stuffed natural intestine S stuffed with the stuffing material, and conveys the stuffed natural intestine S forwardly of the stuffing nozzle. The pinching device 2 is comprised of pinchers 3, which are constituted by pairs of pincher members 3A for pinching the stuffed natural intestine by coming to oppose each other, as well as a wrapping connector means 4 serving as a moving means for continuously moving the pinchers 3.

The wrapping connector means 4 is constituted by two pairs of shafts 5 and 6 and a pair of endless chains 8 each trained between a pair of sprockets 7. The shaft 5 serving as a center of movement of the pincher members 3A is located laterally of the axis X of the stuffing nozzle 1 and in a forward region 10 located forwardly of a distal end 1*a* of the stuffing nozzle, such that the pincher members 3A move from a rearward region 9 located rearwardly of the distal end 1*a* toward the forward region 10.

Figure 2C:
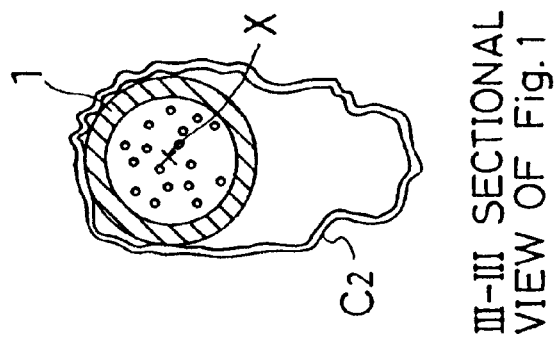
Figure 2B:
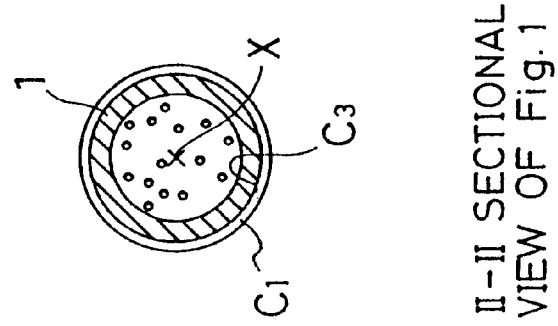
Figure 2A:
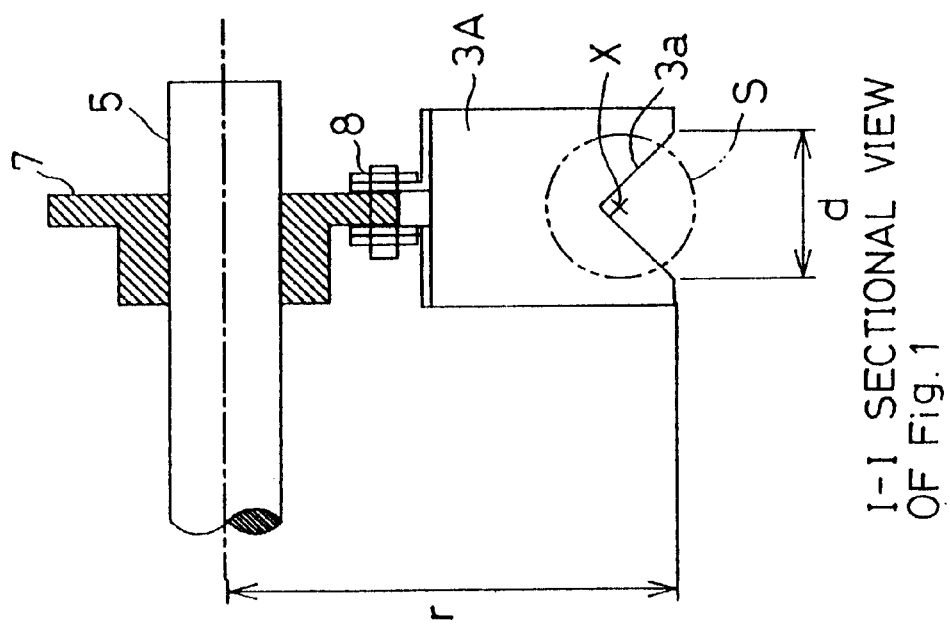

Referring also to FIG. 2A, each pincher member 3A is provided with a V-shaped notched portion 3*a*, and the dimension d of the opening in the notched portion 3*a* is set to a size greater than the outside diameter of the stuffed natural intestine S, while the radius r of the opening is set to be greater than the distance between the distal end of the stuffing nozzle 1 and the shaft 5.

Reference numeral 11 denotes a driving mechanism serving as a nozzle rotating means, and the driving mechanism 11 is driven by an unillustrated motor to rotatively drive the stuffing nozzle 1. The stuffing nozzle 1 is attached to the driving mechanism 11 by means of a nut 12, and the driving mechanism 11 is provided with a stuffing-material passage hole 13 which extends in the direction of the axis X and penetrates the driving mechanism 11.

A description will be given of the operation of the apparatus for manufacturing chain-like food products such as sausages or the like which is arranged as described above in accordance with one embodiment of the present intention.

The natural intestine C is fitted over the stuffing nozzle 1, the shirred natural-intestine portion $C_2$ is manually pulled out forwardly of the stuffing nozzle 1 to form the straightened natural-intestine portion $C_1$ over the stuffing nozzle 1. At the same time, a predetermined length of the straightened natural-intestine portion $C_1$ is allowed to be suspended from the distal end 1*a*.

When the operation of the apparatus is started, the stuffing material is continuously discharged into the straightened natural-intestine portion $C_1$ suspended from the distal end 1*a* of the stuffing nozzle from the distal end of the stuffing nozzle 1. The stuffed natural intestine S thus formed moves toward the pinching device 2 while pulling out the straightened natural-intestine portion $C_1$ over the stuffing nozzle 1 owing to the stuffing pressure.

The notched portions 3*a* of the pinchers 3 of the pinching device 2 are moved toward the forward region located forwardly of the distal end 1*a* of the stuffing nozzle in such a manner as to be brought into close proximity to an outer periphery of the straightened natural-intestine portion $C_1$ fitted over the staffing nozzle 1, and starts to pinch the stuffed natural intestine S at a position close to the distal end 1*a* of the stuffing nozzle The pincher members 3A continue their movement with the respective shafts 5 as their centers, and after completing the pinching of the stuffed natural intestine S, the pincher members 3A pull and convey the stuffed natural intestine S along the axis X while maintaining the pinching state. Since the stuffed natural intestine S is pulled and conveyed by the pinchers 3, the straightened natural intestine portion $C_1$ over the stuffing nozzle 1 moves to pull the shirred natural intestine portion $C_2$ while it is being stretched in the direction of the axis X, and the shirred natural intestine portion $C_2$ becomes the straightened natural intestine portion $C_1$ while it is being stretched to have its diameter reduced. Hereafter, the reduction of the diameter of the natural intestine will be referred to as "the reduced diameter." While the straightened natural intestine portion $C_1$ formed over the stuffing nozzle 1 along the axis X strengthens its degree of contact with the outer periphery of the stuffing nozzle 1 since the straightened natural intestine portion $C_1$ is always being pulled, and rotates together with the stuffing nozzle 1, the straightened natural intestine portion $C_1$ is pulled out from the distal end 1*a* of the stuffing nozzle. The stuffed natural intestine S is rotatively driven by the straightened natural intestine portion $C_1$ which continuously rotates together with the stuffing nozzle 1, with the result that a continuous twisting is imparted to the natural intestine at the position pinched by the aforementioned pinchers 3. A rotating force from the stuffing nozzle 1 is imparted to an inner peripheral surface $C_3$ of the straightened natural intestine portion $C_1$ brought into contact with the outer periphery of the stuffing nozzle 1. If this contact is set in a state of close contact, the rotation of the stuffing nozzle 1 is liable to be imparted more positively.

The aforementioned twisting of the natural intestine is continued until an ensuing pinching by the ensuing pinchers 3 is completed. The pinchers 3 continue to move continuously at a fixed speed, the stuffing pump continuously discharges the stuffing material into the straightened natural intestine portion $C_1$ pulled out from the distal end 1*a* of the stuffing nozzle, thereby forming the stuffed natural intestine S. The pinchers 3 continuously move at a fixed speed, and a fixed amount of stuffing material is continuously discharged into the straightened natural intestine portion $C_1$ which moves while a stretching force to reduce its diameter due to being stretched by the pinchers 3 is applied to the straightened natural intestine portion $C_1$. For this reason, the stuffed natural intestine S having small variations in the stuffed diameter are formed. The ensuing pinchers 3 which are provided on the respective chains 8 at a predetermined interval start to pinch the stuffed natural intestine S at a position close to the distal end 1*a* of the stuffing nozzle. Since the stuffed diameter of the stuffed natural intestine S which is at a position close to the distal end 1*a* of the stuffing nozzle is still small, the twist can be easily produced, and since the position where the twist is produced is close to the distal end 1*a* of the stuffing nozzle, the rotation of the straightened natural intestine portion $C_1$ over the stuffing nozzle 1 is easily imparted at the position where the twist is produced. Hence, a sufficient twist can be reliably imparted to the position of pinching by the pinchers 3.

The pinchers 3 may pinch a larger portion of the stuffed natural intestine than the outside diameter of the stuffing nozzle 1, the larger portion occurring in relation to the conveying speed of the stuffed natural intestine S by the pinchers 3 and the amount of the discharged stuffing material (refer to FIG. 4).

Referring to FIG. 2C, in the nonrotated state of the stuffing nozzle 1, the shirred natural-intestine portion $C_2$ fitted over the stuffing nozzle 1 is in a bellows shaped state of being compressed in the direction of the axis X, and is suspended from the stuffing nozzle. The inside diameter of the shirred natural-intestine portion $C_2$ is generally sufficiently larger than the outside diameter of the stuffing nozzle 1.

Referring to FIG. 2B, the straightened natural intestine portion $C_1$ over the rotating stuffing nozzle 1 is stretched in the direction of the axis X and its diameter is reduced as described above, and the straightened natural intestine portion $C_1$ is substantially brought into close contact with the outer periphery of the stuffing nozzle 1. It suffices if the inner peripheral surface $C_3$ of the straightened natural intestine portion $C_1$ on the whole is in contact with the stuffing nozzle 1, even if there may be a slight gap locally with the outer periphery of the stuffing nozzle 1 or overlapping portions of the membrane.

Returning to FIG. 1, the straightened natural intestine portion $C_1$, which moves toward the distal end 1a of the stuffing nozzle while receiving a braking force from the rotating stuffing nozzle 1, rotatively drives the stuffed natural intestine S. As a result, a twist K is produced in such a manner as to allow the straightened natural intestine portion $C_1$ to be wound around the outer periphery of the stuffing nozzle 1, thereby increasing the closely contacting force.

The straightened natural intestine portion $C_1$ is brought into uniform contact, preferably close contact, with the outer periphery of the stuffing nozzle 1 with a uniform shape along the axis X. Even if the straightened natural intestine portion $C_1$ receives a braking force from the stuffing nozzle 1 necessary for rotatively driving the stuffed natural intestine S, the straightened natural intestine portion $C_1$ slips over the outer periphery of the stuffing nozzle 1 without undergoing breakage, and is pulled out from the distal end 1a of the stuffing nozzle.

As the straightened natural intestine portion $C_1$ is pulled out, the length of the straightened natural intestine portion $C_1$ over the stuffing nozzle 1 from the distal end 1a of the stuffing nozzle increases. In a case where the contact length in the direction of the axis X needs to be maintained within a desired range, the trailing end of the shirred natural-intestine portion $C_2$ is pushed toward the distal end 1a of the stuffing nozzle.

In the case of the natural intestine used, e.g., a sheep's gut, its length is, for example, 8 m per piece, and its diameter changes from 18 mm to 20 mm over its entire length. In a case where the natural intestine C is to be further reduced in relation to the diameter of the stuffing nozzle 1, this adjustment can be attained by increasing the braking force on the natural intestine C by using a braking member serving as an engaging member in the apparatus of the embodiment, which will be described later. Depending on the difficulty of producing the twist in the stuffed natural intestine S (the type of natural intestine, the state of the natural intestine, the size of the stuffed natural intestine, etc.), the distal end 1a of the stuffing nozzle is disposed in such a manner as to be located farther from or more closely toward the pinching device 2 than the illustrated position. In the case of the more closely disposed position, the distal end 1a of the stuffing nozzle is located in the notched portions 3a of the pinchers 3 which move from the rearward region located rearwardly of the distal end 1a of the stuffing nozzle toward the forward region located forwardly thereof. Therefore, the position where the pinching of the stuffed natural intestine S by the notched portions 3a is started is located more closely to the distal end 1a of the stuffing nozzle, with the result that the production of the twist is more facilitated.

Referring to FIGS. 3A to 3E, in the present invention it is possible to use the stuffing nozzle 1 whose outer peripheral shape varies.

Figure 3E:
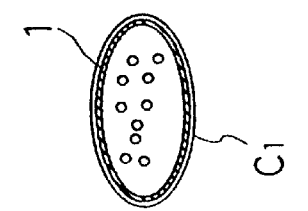
FIGS. 3A to 3E are cross-sectional views illustrating the shapes of the stuffing nozzle which is used as the stuffing nozzle in FIG. 1.
Figure 3D:
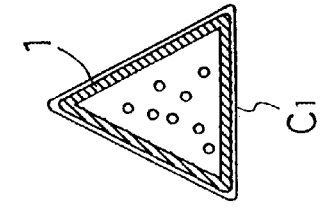
Figure 3C:
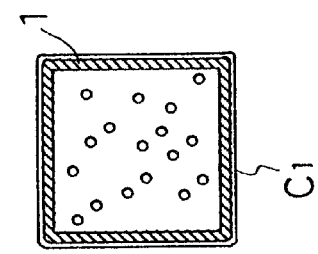
Figure 3B:
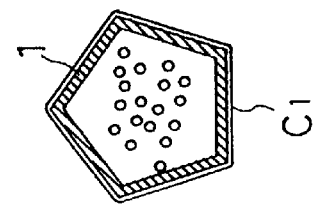
Figure 3A:
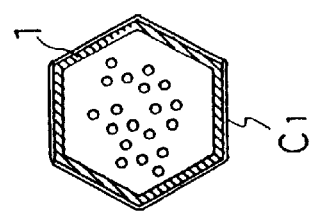

For example, the cross-sectional shape of the stuffing nozzle 1 may not necessarily be circular, but be elliptical, as shown in FIG. 3A.

In addition, it is possible to use a triangular shape as shown in FIG. 3B, a square or rectangular shape as shown in FIG. 3C, a pentagonal shape as shown in FIG. 3D, or a polygonal shape such as a hexagonal shape as shown in FIG. 3E.

If the stuffing nozzle 1 is provided with one of the cross-sectional shapes such as those shown in FIGS. 3A to 3E, the slippage of the straightened natural intestine portion $C_1$ with respect to the stuffing nozzle 1 in the rotational direction can be reduced.

Figure 4A:
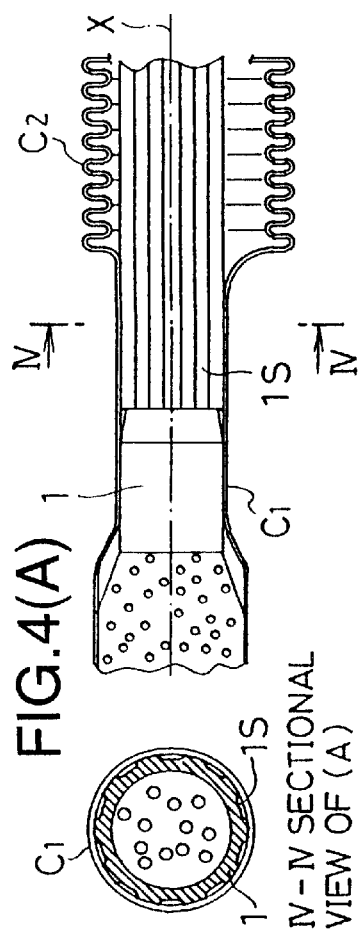
FIGS. 4A to 4C are diagrams illustrating other examples of the shape of the stuffing nozzle.
Figure 4B:
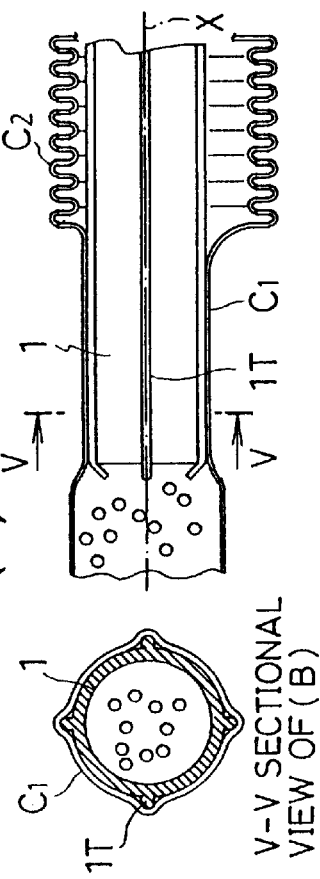
Figure 4C:
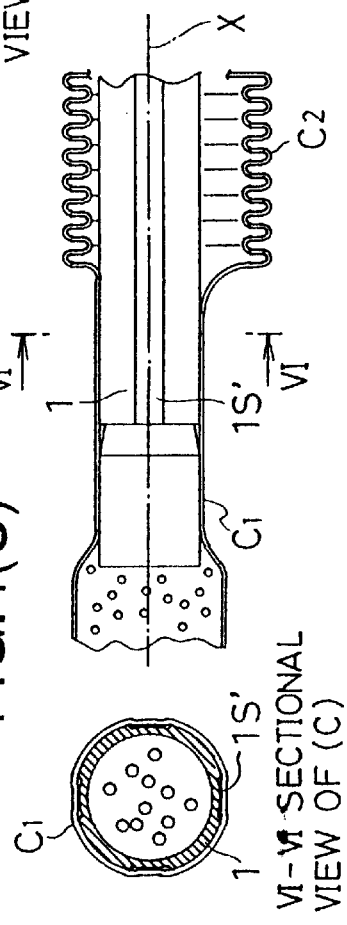

Further, the stuffing nozzle 1 may be provided with an outer peripheral shape in which, as shown in FIG. 4A, a multiplicity of (in this example, 10) grooves 1S are formed on the outer periphery of the stuffing nozzle 1 along the longitudinal direction thereof (the direction of the axis X), an outer peripheral shape in which, as shown in FIG. 4B, protrusions 1T are provided on the outer periphery of the stuffing nozzle 1 along the longitudinal direction thereof, or an outer peripheral shape in which, as shown in FIG. 4C, four flat portions 1S' are provided on the outer periphery of the stuffing nozzle 1 along the longitudinal direction thereof. In the stuffing nozzle 1 having any one of these outer peripheral shapes, as the shirred natural intestine portion $C_2$ is stretched, the diameter (18 to 20 mm) of the natural intestine is reduced to the outside diameter of the stuffing nozzle 1, e.g., 10 mm, so that the shirred natural intestine portion $C_2$ becomes the straightened natural intestine portion $C_1$ and is brought into contact with the outer periphery of the stuffing nozzle 1.

It should be noted that if the stuffing nozzle 1 is provided with one of the shapes such as those shown in FIGS. 4A to 4C, the slippage of the straightened natural intestine portion $C_1$ with respect to the stuffing nozzle 1 in the rotational direction can be reduced.

It should be noted that the wrapping connector means of the pinching device is not limited to the arrangement of the sprockets and the chains as illustrated in the drawings, and it is possible to use a known wrapping connector means such as timing pulleys and timing belts.

Next, referring to FIGS. 5 to 8B, a description will be given of another embodiment of the present invention.

Figure 7:
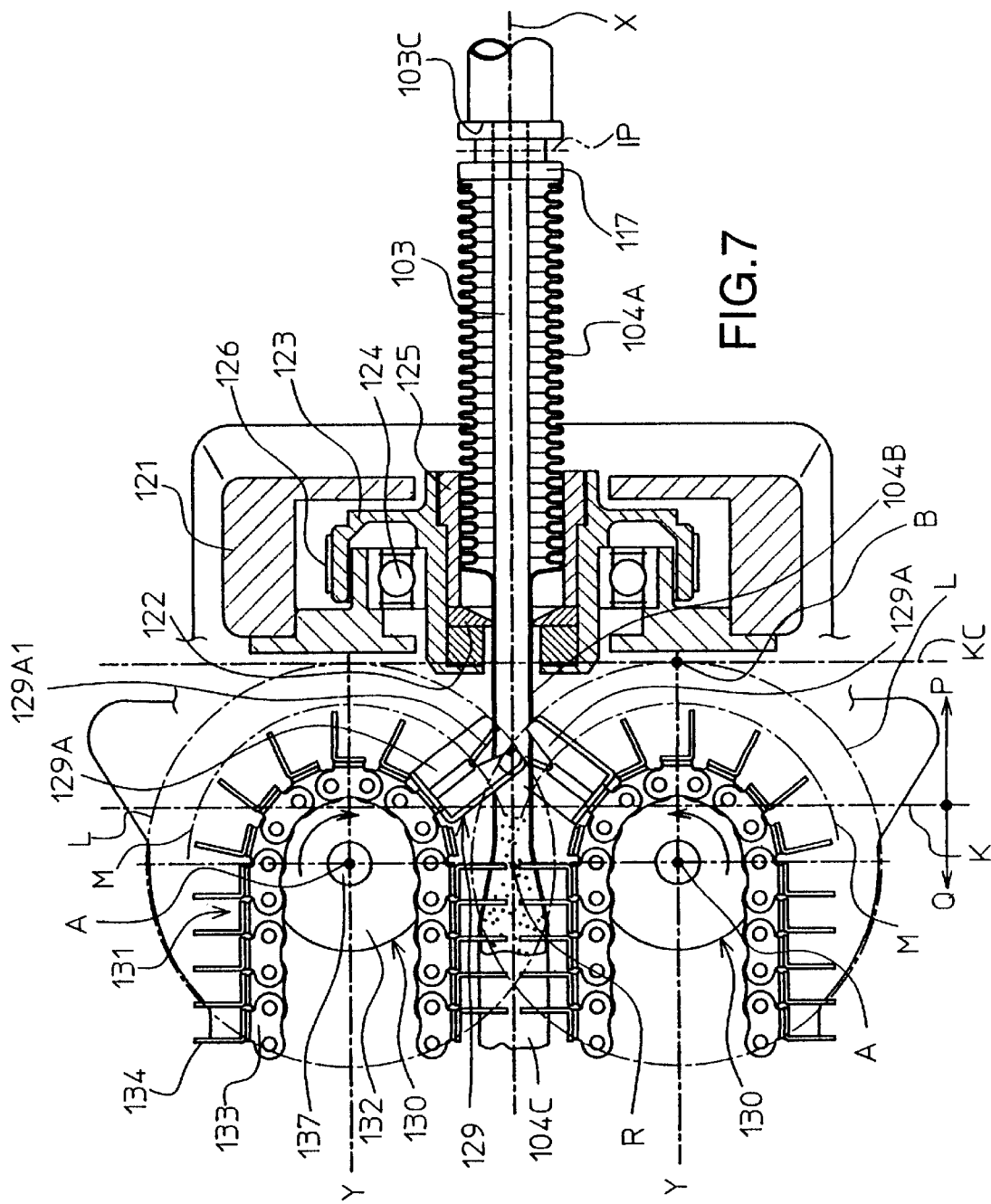
FIG. 7 is an enlarged cross-sectional plan view of the stuffing nozzle, the braking member, and the pinchers which are shown in FIGS. 5 and 6.

FIGS. 5 to 8B are diagrams illustrating a method and an apparatus for manufacturing chain-like food products such as sausages or the like using a natural intestine in accordance with an embodiment of the present invention. Incidentally, FIG. 5 is a schematic front elevational view of a manufacturing apparatus in accordance with the present invention; FIG. 6 is a plan view thereof; and FIGS. 7, 8A, and 8B are enlarged partially cutaway views illustrating the operation for forming a twisted portion in the stuffed natural intestine.

In the drawings, reference numeral 101 denotes a stuffing pump for supplying under pressure a stuffing material such as an emulsion-type sausage material or the like; 102 denotes a stuffing block for accommodating the stuffing material supplied from the stuffing pump 101; and 103 denotes a stuffing nozzle with a round pipe shape for stuffing a natural intestine 104, which will be described later, with the stuffing material supplied from the stuffing pump 101. The stuffing nozzle 103 has a hole 103a formed therein, and when the hole 103a is located in the stuffing block 102, the stuffing material is fed into the stuffing nozzle 103 through the hole 103a. The natural intestine 104, which is a sheep's gut or a hog's gut, is fitted over the stuffing nozzle 103.

The supply amount of the stuffing pump 101 is made variable. The stuffing-pump driving mechanism for driving the stuffing pump will be described below.

The rotation of a motor 105 for the stuffing pump is transmitted to a speed reducing gear 107 via a speed change gear 106. The speed change gear 106, which serves as a speed change means for changing the pump speed, is constituted by a speed charge pulley 106A, a belt 106B, and a speed change pulley 106C. For this reason, the rotation of the motor 105 for the stuffing pump is transmitted to the speed change pulley 106C via the speed change pulley 106A and the belt 106B, and the rotation of the speed change pulley 106C is inputted to the speed reducing gear 107. An electromagnetic clutch 106D engages or disengages the transmission of rotation between the speed change pulley 106C and the speed reducing gear 107. Hence, the supply amount of the pump can be set as desired.

The output rotation of the speed reducing gear 107 is coupled to an unillustrated rotating shaft of the stuffing pump 101 via a coupling 108. The above-described changeable mechanism and the motor 105 can be replaced with a belt transmission mechanism whose ratio is unchangeable and a variable speed motor. Alternatively, an output shaft of a variable speed motor or a variable speed motor with a reducing gear may be directly coupled to the rotating shaft of the stuffing pump 101. By the term "variable speed motor" is meant, for example, a servo motor or an inverter-controlled motor.

The stuffing nozzle 103 is rotatable, and its rotating mechanism serving as a nozzle rotating means will be described below.

A motor 109 for rotating the stuffing nozzle is a variable speed motor, and is capable of setting the number of revolutions of the stuffing nozzle 103 as desired. A belt 111 is wound around a pulley 110 of the motor 109, and the belt 111 is also wound around a pulley 112 for rotating the stuffing nozzle. The pulley 112 for rotating the stuffing nozzle is rotatably held by a housing 114 secured on a bed 113. The pulley 112 for rotating the stuffing nozzle is provided with a clutch pawl 112A. The stuffing nozzle 103 is connected to a cylinder rod 116A of an air cylinder 116 by means of a rotary joint 115, and the stuffing nozzle 103 is thereby reciprocated. The stuffing nozzle 103 is provided with a clutch pawl 103B engaging with the clutch pawl 112A. For this reason, when the stuffing nozzle 103 is moved by the air cylinder 116, the clutch pawls 112A and 103B engage each other, so that the rotation of the pulley 112 for rotating the stuffing nozzle is transmitted to the stuffing nozzle 103.

The natural intestine 104 is fitted over the stuffing nozzle 103 in a state in which the natural intestine 104 is sectioned into a shirred natural-intestine portion 104A and a straightened natural intestine portion 104B. An intestine pusher 117, which serves as a natural-intestine pushing member for pushing the shirred natural-intestine portion 104A toward the distal end of the stuffing nozzle 103, is fitted over the stuffing nozzle 103. The intestine pusher 117 is connected to an air cylinder 119 by means of a rod 118, and is moved by the air cylinder 119. In addition, the stuffing nozzle 103 is provided with a stepped portion 103C against which the intestine pusher 117 abuts, so as to move the intestine pusher 117 in conjunction with the movement of the stuffing nozzle 103. For this reason, the intestine pusher 117 is moved by the movement of the stuffing nozzle 103, and the position of the intestine pusher 117 when the forward advancement of the stuffing nozzle 103 is completed is an initial position IP shown in FIG. 5. The intestine pusher 117 is rotatable fitted over the stuffing nozzle 103, and a pushing member 118a secured to the rod 118 is fitted in an outer peripheral groove of the intestine pusher 117, thereby imparting the reciprocating motion of the rod 118 to the intestine pusher 117.

A detecting means 120 for detecting a trailing end of the intestine is provided on the bed 113. The detecting means 120 is constituted by a photoelectric sensor 120A which confirms the presence of the natural intestine 104 when light is shielded by the shirred natural-intestine portion 104A of the natural intestine 104 fitted over the stuffing nozzle 103, and detects the absence of the shirred natural-intestine portion 104A and the presence of the straightened natural intestine portion 104B when the light passes. The detecting means 120 has a stopper portion 120B, and as the stopper portion 120B and the pushing member 118a come into contact with each other, the movement of the intestine pusher 117 is stopped.

A housing 121 is further provided on the bed 113, and a braking member 122 serving as an engaging member is provided in the housing 121 in such a manner as to be rotatable by means of a pulley 123.

Referring to FIG. 7, a more detailed description will be given of this arrangement. The pulley 123 is held in the housing 121 in such a manner as to be rotatable by means of a bearing 124. The braking member 122 is provided in a central hole of the pulley 123. The braking member 122 is secured by a braking-member holder 125. The braking member 122 is formed of an annular member made of a synthetic rubber, and has an round opening through which the stuffing nozzle 103 is passed. The diameter of the opening is set to be identical to or smaller than the diameter of the stuffing nozzle 103.

The braking-member holder 125 partially accommodates the shirred natural-intestine portion 134A fitted over the stuffing nozzle 103, and serves as a shirred natural-intestine rotating member for rotatively driving the shirred natural-intestine portion 104A by coming into contact with the outer periphery of the shirred natural-intestine portion 104A.

A rotatively driving mechanism for rotating the braking member 122 serving as an engaging member about the axis X will be described below. A belt 126 is wound around the pulley 123, and the belt 126 is also wound around a pulley 128 of a motor 127 for the braking member. The motor 127 for the braking member is a variable speed motor, and is capable of setting the number of revolutions of the braking member 122 as desired.

In addition, a pinching device 131, which is comprised of pinchers 129 consisting of pairs of pincher members 129A and a moving means 130 for moving the same, is provided on the bed 113.

Referring also to FIG. 6, the moving means 130 consists of two pairs of rotating shafts 137, two sprockets 132 and two idle sprockets 132A attached to the respective rotating shafts 137, a pair of endless chains 133 each trained between the sprocket 132 and the idle sprocket 132A, and a multiplicity of lugs 134 attached to the respective chains 133.

The plurality of pincher members 129A are attached to the respective chains 133, and the stuffed natural intestine is pinched by the two pincher members 129A which come to oppose each other while moving together with the chains 133. A pinching-device driving mechanism consists of a motor 131A for pinching, a speed change gear 135, and a speed reducing gear 136.

The sprocket 132 is rotated by the motor 131A for pinching via the speed change gear 135, the speed reducing gear 136, and the rotating shaft 137. The moving speed of the pinchers members 12A can be set as desired. The aforementioned driving mechanism can be substituted by a variable speed motor. A variable speed motor or a variable speed motor with a speed reducing gear may be used by directly coupling an output shaft of such a variable speed motor to the rotating shaft 137.

Each pincher member 129A has a V-shaped notched portion, and the stuffed natural intestine is pinched by the V-shaped notched portions of the two pincher members 129A which come to oppose each other.

Referring mainly to FIGS. 7, 8A, and 8B, a description will be given hereafter of the operation of the above-described apparatus for manufacturing chain-like food products such as sausages or the like in accordance with one embodiment of the present invention.

First, the natural intestine 104 is fitted over the stuffing nozzle 103. In this case, the natural intestine 104 is fitted in a state in which it is sectioned into the shirred natural-intestine portion 104A and the straightened natural intestine portion 104B, as shown in FIG. 5.

Then, the air cylinder 116 it actuated to allow the stuffing nozzle 103 and the straightened natural intestine portion 104B to be passed through the opening in the braking member 122. At this time, the intestine pusher 117 is pushed by the stepped portion 103C of the stuffing nozzle 103 and is moved up to the initial position IP. The interior of the air cylinder 119 communicates with the atmospheric air so that the rod 118 can be moved together with the intestine pusher 117.

Next, the stuffing pump 101 and the pinching device 131 start operation, allowing the stuffing material to be discharged from the distal end of the stuffing nozzle 103. Then, the straightened natural intestine portion 104B is pulled out from the stuffing nozzle 103, and the stuffing material is charged into the straightened natural intestine portion 104B, thereby forming a stuffed natural intestine 104C. This stuffed natural intestine 104C is first pinched and pulled by the lugs 134 of the pinching device 131 which moves in the direction of arrow. Then, the stuffed natural intestine 104C is pinched by the pinchers 129.

When the stuffed natural intestine 104C pulls the straightened natural intestine portion 104B, the straightened natural intestine portion 104B moves while slipping and being braked by the stuffing nozzle 103. Also, since the straightened natural intestine portion 104B is also engaged with the opening portion of the braking member 122, the straightened natural intestine portion 104B receives a further braking force from the braking member 122. Since the straightened natural intestine portion 104B is stretched particularly between the pinchers 129 and the braking member 122, the straightened natural intestine portion 104B fitted over the stuffing nozzle 103 is subjected to reduction in its diameter more strongly, and the straightened natural intestine portion 104B is brought into contact with or close contact with the outer periphery of the stuffing nozzle 103. For this reason, the rotation of the stuffing nozzle 103 is transmitted to the stuffed natural intestine 104C by means of the straightened natural intestine portion 104B whose diameter is reduced, and the stuffed natural intestine 104C is consequently rotated by the rotation of the stuffing nozzle 103. Hence, a twist is produced in the portion of the stuffed natural intestine 104C pinched by the pinchers 129, thereby forming a linked portion.

In accordance with the present invention, it suffices if the straightened natural intestine portion on the stuffing nozzle in the state of a reduced diameter rotates together with the stuffing nozzle. In the apparatus of this embodiment in which the braking member serving as the engaging member is rotated by the rotatively driving mechanism, even if the braking member 122 substantially imparts a rotating force to the outer periphery of the straightened natural intestine portion 104B, such a case does not depart from the scope of the present invention.

Figure 9:
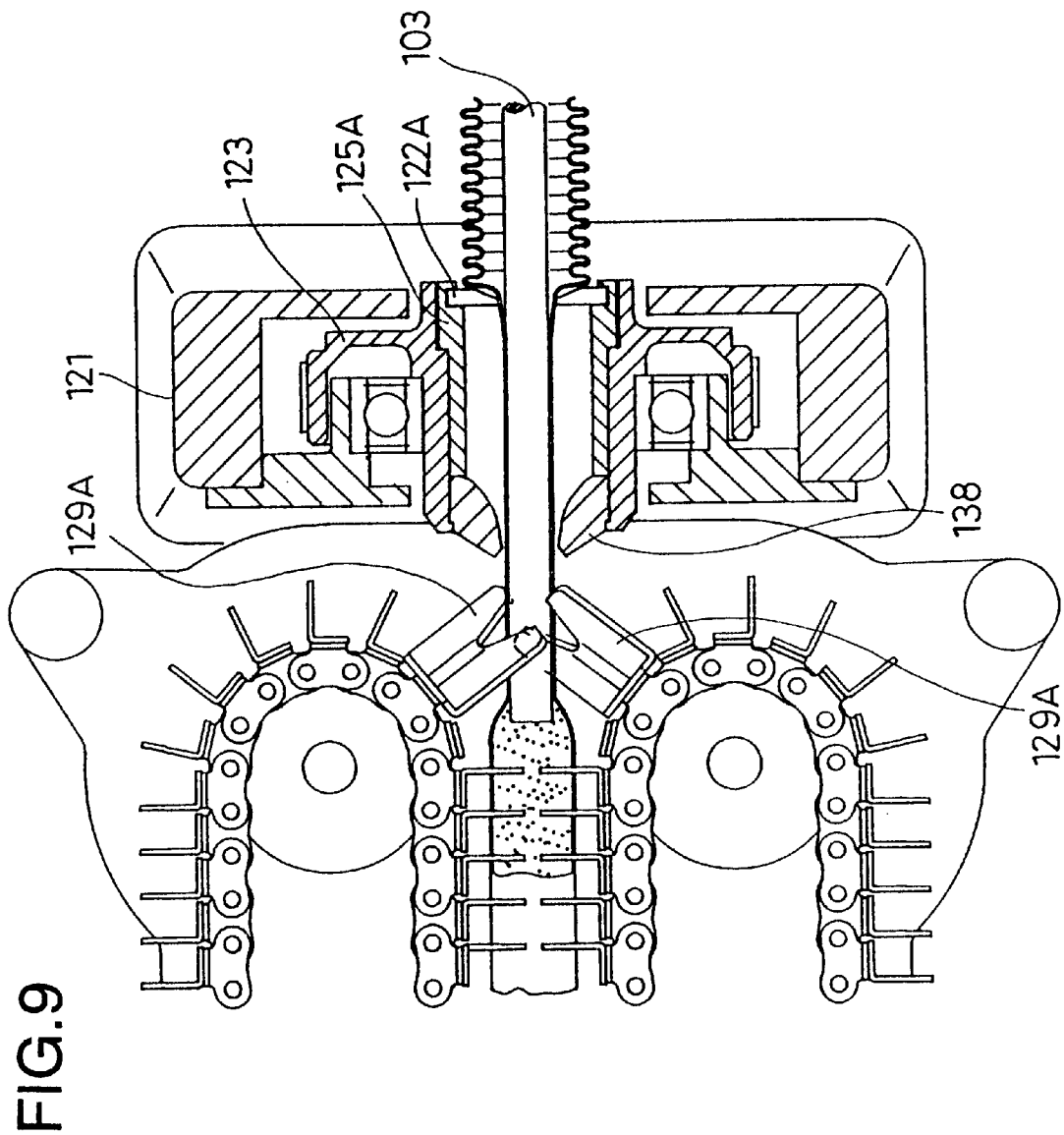
FIG. 9 is a cross-sectional plan view illustrating still another embodiment of the present invention in which the run out of a distal end of the stuffing nozzle is prevented.

To further reduce the diameter of the natural intestine, the engaging member engaging with the natural intestine fitted over the stuffing nozzle is capable of assuming various forms. For example, it is possible to cite a form in which, as shown in this embodiment, the engaging member abuts against the outer periphery of the straightened natural intestine portion 104B, and a form in which, as shown in FIG. 9 (the braking member 122A) which will be referred to later, the engaging member has a hole diameter larger than the outside diameter of the stuffing nozzle 103, and comes into contact mainly with the shirred natural-intestine portion 104A.

A more detailed description will be given of the path of operation of the above-described pinchers 129.

As shown in FIG. 7, the pincher members 129A of the pinchers 129 move from a rearward region P toward a forward region Q located relative to a reference line passing through the distal end (discharging end) of the stuffing nozzle 103. Then, the pincher members 129A engage each other at an engaging position R located forwardly of the distal end of the stuffing nozzle 103. Here, the closer to the distal end of the stuffing nozzle 103 the engaging position R is, the more preferable. Namely, the closer to the distal end of the stuffing nozzle 103 the engaging position R is, the more reliably a twist can be produced in the stuffed natural intestine 104C.

To describe this aspect with reference to FIGS. 8A and 8B, when the path of rotation of the troughs of the V-shaped grooves of the pincher members 129A is such that the troughs of the V-shaped grooves are substantially brought into contact with the outer periphery of the distal end of the stuffing nozzle 103, the engaging position R of the pinchers 129 is close to the distal end of the stuffing nozzle 103. In such a state, if the pinchers 129 pinch the stuffed natural intestine 104C, the twisting position of the stuffed natural intestine 104C can be reliably specified to the pinched portion, and the breakage of the stuffed natural intestine 104C is prevented.

When the shirred natural intestine portion 104A of the natural intestine 104 over the stuffing nozzle 103 ceases to be present, the photoelectric sensor 120A of the detecting means 120 is operated to turn off the electromagnetic clutch 106D and stop the operation of the stuffing pump 101. Then, the air cylinder 116 is retracted to move the stuffing nozzle 103 rightwardly in FIG. 5, and at the same time the air cylinder 119 is also retracted to move the intestine pusher 117, thereby completing the stuffing operation. Although a transmission type is used as the photoelectric sensor 120A, but the type of sensor is not restricted.

Next, a description will be given of the operation of the intestine pusher 117. When the natural intestine 104 over the stuffing nozzle 103 is consecutively pulled out, the length of the straightened natural intestine portion 104B becomes long. To reduce this length, the air cylinder 119 is actuated to move the pushing member 118a of the rod 118 until the pushing member 118a abuts against the stopper 120B. As a result of this movement, the intestine pusher 117 which was stopped at the initial position IP moves to a predetermined position, and pushes the trailing end of the shirred natural intestine portion 104A in steps. The intestine pusher 117 is stopped at the aforementioned predetermined position until all the stuffing operation is completed. The predetermined position may be advanced from the initial position IP in a multiplicity of steps.

In this embodiment, the stuffing nozzle 103 and the intestine pusher 117 are operated by air cylinders, but these members may be operated manually instead. Namely, an arrangement may be provided such that the interiors of the air cylinders 116 and 119 are made to communicate with the atmospheric air, a handle is secured to the rod 116A of the air cylinder 116, and another handle is secured to the rod 118 as well. By pushing these handles in the leftward and rightward directions in FIG. 5, the stuffing nozzle 103 and the intestine pusher 117 can be operated manually.

The installed position of the photoelectric sensor 120A of the detecting means may be changed to a position which permits the photoelectric sensor 120A to detect the pushing member 118a which is stopped by the stopper 120B, and the photoelectric sensor 120A may be operated to detect the pushing member 118a at that position. In the method in which the intestine pusher 117 is operated manually, it is effective to stop the stuffing pump 101 by this detecting method.

Figure 16:
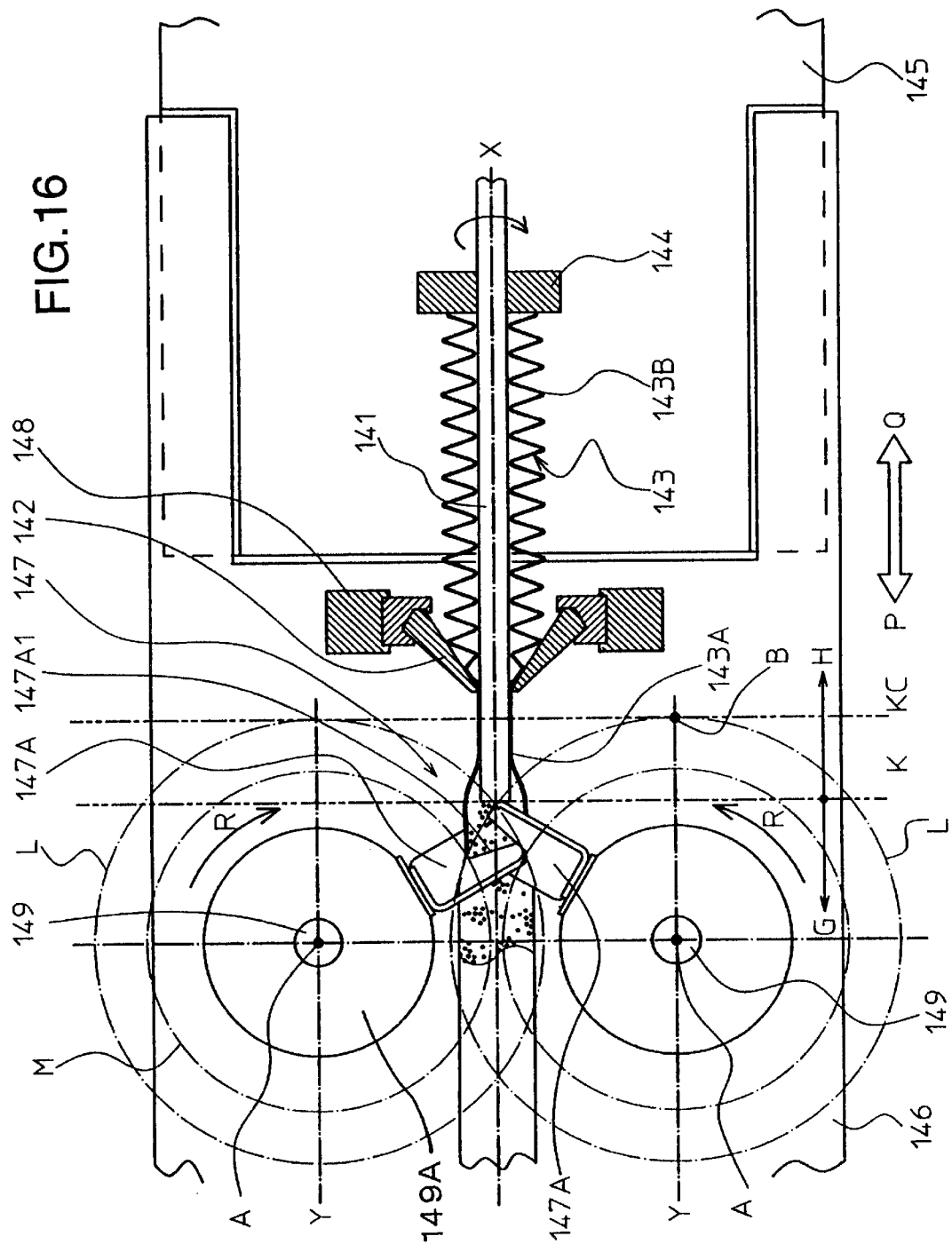
FIG. 16 is a partly cutaway front elevational view illustrating a further embodiment of the present invention in which an engaging member is mainly added to the apparatus shown in FIG. 10.
Figure 17:
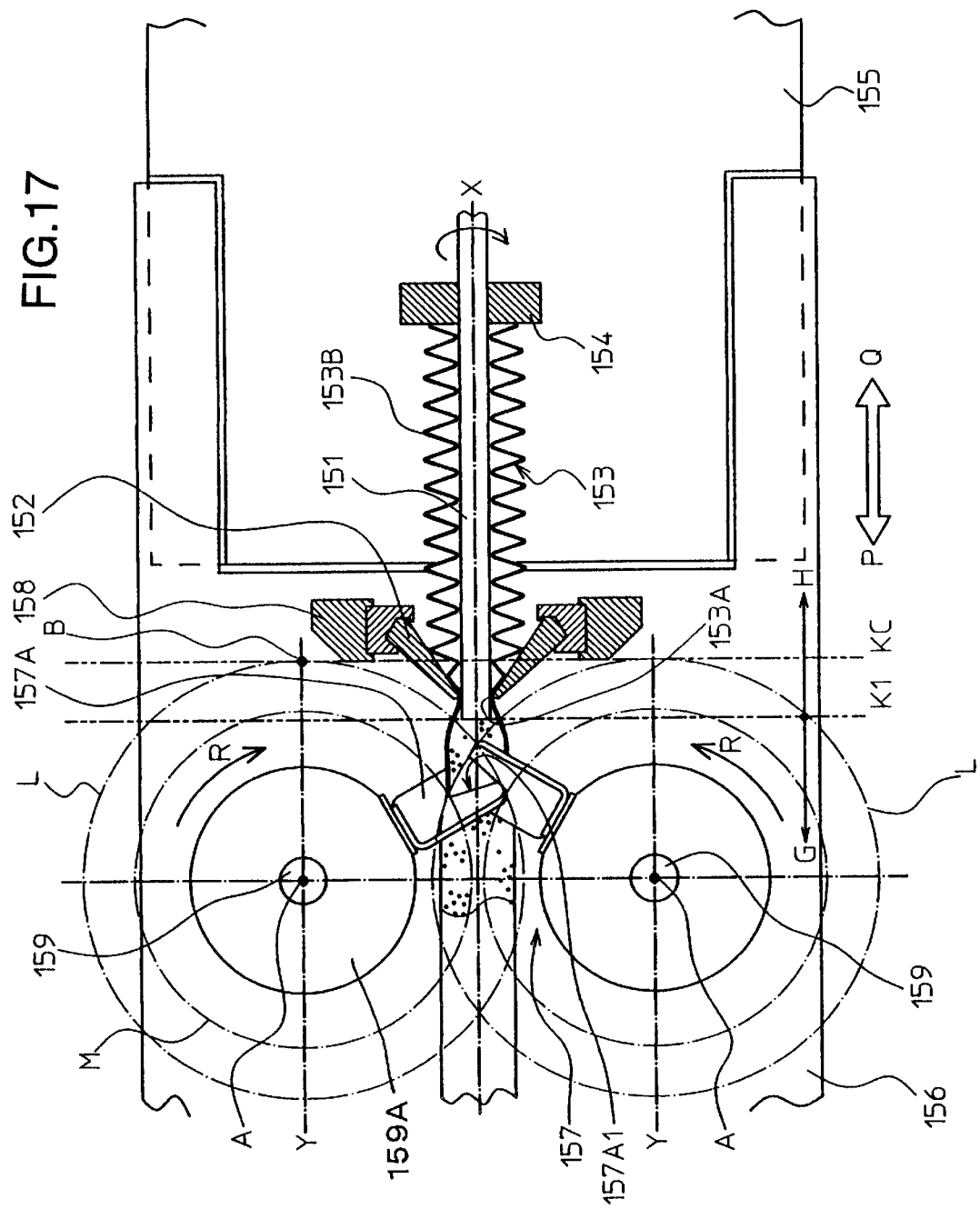
FIG. 17 is a partly cutaway front elevational view illustrating a further embodiment of the present invention in which the arrangement of the stuffing nozzle add the engaging member differs from that of the apparatus shown in FIG. 16.

Although during the above-described stuffing operation, the braking member 122 is rotated by the motor 127 for the braking member, the braking member 122 may not necessarily be forcibly rotated. For example, a structure may be provided such that the braking member 122 is rotatably held, and the braking member 122 is rotated by the rotation of the stuffing nozzle 103. Furthermore, in the embodiments described above, it is possible to employ the arrangement of the stuffing nozzle and the braking member used in the embodiments which will be mentioned below (FIG. 16 and FIG. 17).

In the embodiments illustrated in FIGS. 1 through 8B, there are cases where if the stuffing nozzle is bent or its rigidity is low, the stuffing nozzle may move in a swaying manner up and down or left and right, possibly coming into contact with the pinchers. Accordingly, it is possible to adopt a structure in which, as shown in FIG. 9, a member for preventing the running out of the stuffing nozzle 103 is provided to prevent contact with the pincher members 129A.

That is, a run-out preventing member 138 is fixed by a run-out preventing member holder 125A having a braking member 122A so as to rotate integrally with the pulley 123. The inside diameter of the run-out preventing member 138 is set to be larger than the outside diameter of the stuffing nozzle 103. Even if the run out occurs in the stuffing nozzle 103, the amount of run out is restricted by a hole portion of the run-out preventing member 138, thereby preventing the stuffing nozzle 103 from contacting the pincer members 129A. Although the material of the run-out preventing member 138 is selected appropriately, a synthetic resin which is unlikely to be deformed is preferable. It is not necessary to dispose the run-out preventing member 138 if a material which is unlikely to be deformed is used for the braking member. The braking member 122A strokes the natural intestine C to undo subtle overlapping of the straightened natural intestine portion 104B in the process in which the shirred natural intestine portion 104A is stretched by the straightened natural intestine portion 104B which moves by being pulled by the stuffed natural intestine 104C.

Although in the embodiment shown in FIGS. 5 to 8B, the stuffing nozzle is reciprocated, the present invention is not limited to the above-described embodiment, and it is possible to adopt a structure in which the stuffing nozzle is fixed, and the pinching device is moved, as will be described below.

Referring to FIGS. 10 to 12E, a stuffing nozzle 61 is rotatable, but it does rot reciprocate. A natural intestine 66 is fitted over the stuffing nozzle 61 in a state in which the natural intestine 66 is sectioned into a shirred natural-intestine portion 66A and a straightened natural intestine portion 66B. A stuffing material is automatically fed into the stuffing nozzle 61 from a stuffing pump 62. Further, as for a nozzle rotating means for rotating the stuffing nozzle 61, a transmission gear 64 attached to a variable speed motor 63 for rotating the stuffing nozzle is engaged with a driving member 65 with a transmission gear, whereby the stuffing nozzle 61 attached to the driving member 65 with a transmission gear is rotated. An output shaft of a variable speed motor 62B for the stuffing pump is connected to a pump shaft 62A of the stuffing pump 62. The stuffing nozzle 62 is operated at a desired speed by the driving mechanism having the variable speed motor 62B.

Furthermore, although in the embodiment shown in FIGS. 5 to 8B, the intestine pusher is automatically moved by the air cylinder, in this embodiment an intestine pushing collar 67 serving as a natural-intestine pushing member is manually pushed toward the distal end of the stuffing nozzle 61 by the operator so as to push the natural intestine 66 fitted over the stuffing nozzle 61. A stopper 68 is provided to stop the movement of the intestine pushing collar 67, and the stopper 68 constitutes a detecting means 69 together with a photoelectric sensor 69A for detecting the trailing end of the natural intestine 66 fitted over the stuffing nozzle 61. The variable speed motor 62B for the stuffing pump for driving the stuffing pump 62 is stopped by a signal from the detecting means 69. The operation of the detecting means 69 is substantially similar to that in the foregoing embodiment.

A pinching device is provided in proximity to the distal end of the stuffing nozzle 61, and a conveying device 71 is provided on the downstream side thereof for continuously conveying at a predetermined speed a stuffed natural intestine 66C stuffed with the stuffing material by nipping the stuffed natural intestine 66C. These devices are mounted on a mounting member 72. The mounting member 72 is attached to a housing 74 in which the stuffing nozzle 61 is attached, in such a manner as to be rotatable in the direction of double-headed arrow P by means of a pin 73.

The pinching device 70 in this embodiment is structured such that a pair of pincher members 70C each having a U-groove 70E are respectively attached to two rotating members 70A arranged vertically in face-to-face relationship. A pinched portion is formed in the stuffed natural intestine 66C by means of the U-grooves 70E of the two pincher members 70C. A pinching-device driving mechanism for driving the pinching device 70 is provided on the mounting member 72. The pinching-device driving mechanism has a motor 75 for the pinchers and a pair of gears 76. One rotating member 70A of the pinching device 70 is attached to a rotating shaft 70D connected to a shaft of the motor 75 for the pinchers, and is rotated at a desired number of revolutions by the motor 75. The gears 76 are used to rotate the other opposing rotating member 70A. The aforementioned rotating members 70A and the rotating shafts 70D constitute a moving means for moving the pinchers 70B. The rotating members 70A may be omitted, and the pincher members 70C may be attached directly to the rotating shafts 70D, respectively To ensure that the pincher members 70C move from the rearward region P located rearwardly of the distal end 61A of the stuffing nozzle 61 toward the forward region Q located forwardly thereof, the rotating shafts 70D of the pincher members 70C, which serve as the centers of movement, are disposed at positions symmetrical about the axis X of the stuffing nozzle 61. The pair of pincher members 70C constituting pinchers 70B rotate together with the rotating shafts 70D, and after pinching the stuffed natural intestine 66C which is conveyed by the conveying device 71, the pair of pincher members 70C immediately cancel pinching. The arrangement that the engaging position R of the pincher members 70C is located in proximity to the distal end 61A of the stuffing nozzle 61, as well as the operation of the arrangement, are substantially similar to those of the other embodiments described above.

The nozzle rotating means continuously rotates the stuffing nozzle 61 in such a manner as to impart a twist to the position in the stuffed natural intestine 66C pinched by the pinchers 70B. Instead of continuously rotating the stuffing nozzle 61, the variable speed motor 63 may intermittently rotate the stuffing nozzle 61 such that the pinchers 70B completes the formation of the twist only while pinching the stuffed natural intestine 66C.

In this embodiment, the length of the sausage can be varied as desired.

If the period of pinching by the pinchers 70B is set, as desired, with respect to the stuffed natural intestine 66C which is conveyed by the conveying device 71, it is possible to obtain a desired interval of twisting of the stuffed natural intestine (i.e., the length of the sausage).

The speed (i.e., the number of revolutions) of the pincher members 70C can be set, as desired, by the motor 75 for the pinchers, which is a variable speed motor, while the conveying speed of the conveying device 71 can be set, as desired, by a motor 77 for the conveying device, which is a variable speed motor, for driving the conveying device 71.

In terms of the rotation of the pincher members 70C, the pincher members 70C may be operated at either constant speed or nonconstant speed, In the case of the constant speed, a difference in speed occurs between the speed of the pincher members 70C and the speed of the stuffed natural intestine 66C being conveyed at the time when the stuffed natural intestine 66C is being pinched by the pincher members 70C. However, in this embodiment in which the stuffed natural intestine 66C is pinched at the position located in proximity to the distal end of the stuffing nozzle, it is possible to impart a twist reliably even if there is a difference in speed.

In the case of the nonconstant speed, the speed of the pincher members 70C being pinching the stuffed natural intestine 66C can be set at a speed substantially equivalent to the speed of the stuffed natural intestine 66C being conveyed. The motor 75 is controlled by an appropriate controller so as to effect nonconstant speed rotation. The term "nonconstant speed rotation" of the pincher members 70C which is referred to herein includes intermittent rotation.

Incidentally, although the number of pinchers 70C attached to one rotating member 70A may be one as illustrated in the drawings, the number of pinchers 70C attached to one rotating member 70A may be set to two or more.

The conveying device 71 is arranged such that a pair of upper and lower endless chains 71A arranged in face-to-face relation are rotated endlessly by sprockets 71B, respectively, and the stuffed natural intestine 66C is nipped by lugs 71C provided on the chains 71A so as to continuously convey at a constant speed the stuffed natural intestine 66C. Incidentally a description has already been given of the operation in which the stuffed natural intestine 66C is conveyed, and the natural intestine 66 is made to undergo a reduction in diameter so as to be brought into contact, preferably close contact, with the stuffing nozzle 61 by pulling and moving the straightened natural intestine portion 66B of the natural intestine 66 fitted over the stuffing nozzle 61. Therefore, a detailed description thereof will be omitted here.

To nip the stuffed natural intestine 66C by means of the lugs 71C, it is necessary to prevent slippage as much as possible. Therefore, structures such as those shown in FIGS. 12A to 12E are adopted.

First in FIGS. 12A, 12C, and 12D, the lugs 71C which are arranged in face-to-face relation are disposed at positions offset from each other. According to this structure, since the lugs 71C on both chains do not collide against each other, it is possible to nip the stuffed natural intestine 66C firmly.

Meanwhile, in FIGS. 12B and 12E, the lugs 71C which are arranged in face-to-face relation are disposed at the same positions. According to this structure as well, it is possible to prevent the slippage of the stuffed natural intestine 66C.

The prevention of the slippage of the stuffed natural intestine 66C in the above-described manner means that the length of the conveying device 71 can be shortened by that margin. Consequently, the mounting member 72 can be made compact, and the opening/closing operation of the mounting member 72 can be effected speedily.

In the apparatus of this embodiment, it is possible to further provide an engaging member through which the stuffing nozzle 61 is inserted, and which engages the natural intestine 66 which is fitted over the stuffing nozzle 61. Further, it is also possible to further provide the rotatively driving mechanism for rotating the engaging member about the axis X of the stuffing nozzle 61. This rotatively driving mechanism may be further provided with a motor for rotating the engaging member. This motor may be a variable speed motor.

Furthermore, an arrangement may be provided such that the intestine pushing collar 67 serving as the natural-intestine pushing member is moved in steps by a known actuator.

Figures 13A, 13B:
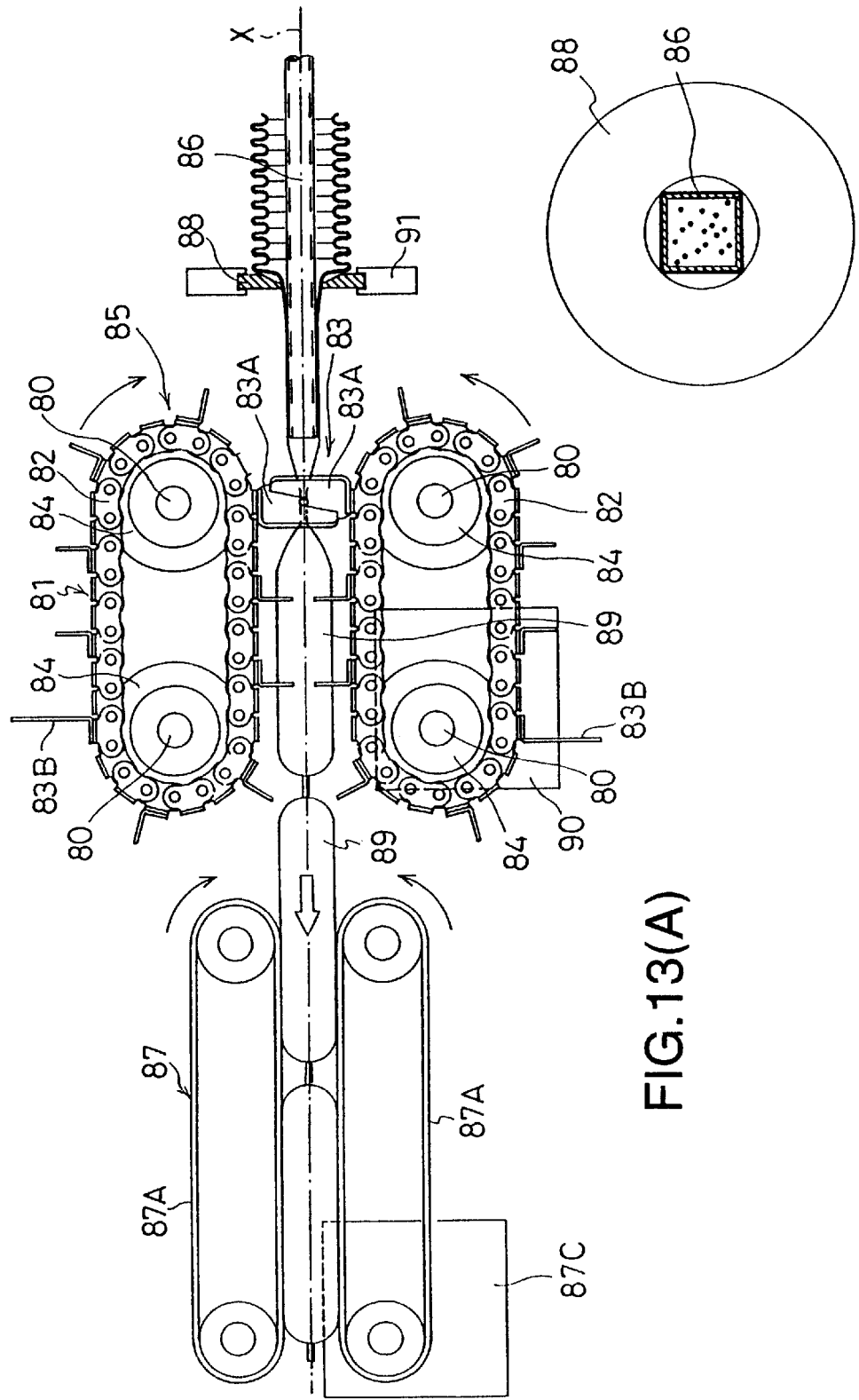
FIG. 13A is a partly cutaway front elevational view illustrating a still further embodiment of the present invention.
FIG. 13B is a cross-sectional view of the stuffing nozzle and a braking member shown in FIG. 13A.

In the present invention, it is possible to adopt an embodiment such as the one shown in FIGS. 13A and 13B. This embodiment is similar to the embodiment shown in FIGS. 10 and 11 in that sausages of a desired length can be obtained. However, this embodiment differs from the same in the construction of the pinching device, as will be described below.

A pinching device 81 is comprised of two pairs of pincher members 83A and 83B, one pair of which is provided at an equal interval on each of a pair of endless chains 82, as well as a moving means 85 including rotating shafts 80 for moving the pincher members 83A and 83B, the pair of chains 82, and sprockets 84. The two pincher members 83A, which engage each other by opposing each other from upper and lower positions, move linearly in the forward direction of a stuffing nozzle 86, and subsequently cancel their engagement. The two pincher members 83A and the two pincher members 83B, which are respectively provided at symmetrical positions about the axis X of the stuffing nozzle 86, constitute pinchers 83. A conveying device 87 consists of two flat endless belts 87A which oppose each other. Reference numeral 87C denotes a variable speed motor for driving the conveying device 87.

As shown in FIG. 13B, the stuffing nozzle 86 is a pipe having a square cross section, and a braking member 88 has a round through hole and abuts against the four corners of the stuffing nozzle 86. The braking member 88 rotates inside a bracket 91 together with the stuffing nozzle 86 due to the rotation of the stuffing nozzle 86. The braking member 88 is engaged with the natural intestine 89 to reliably stretch the shirred natural intestine portion 89A in the bellows shaped state so as to form the straightened natural intestine portion 89B.

Figure 10:
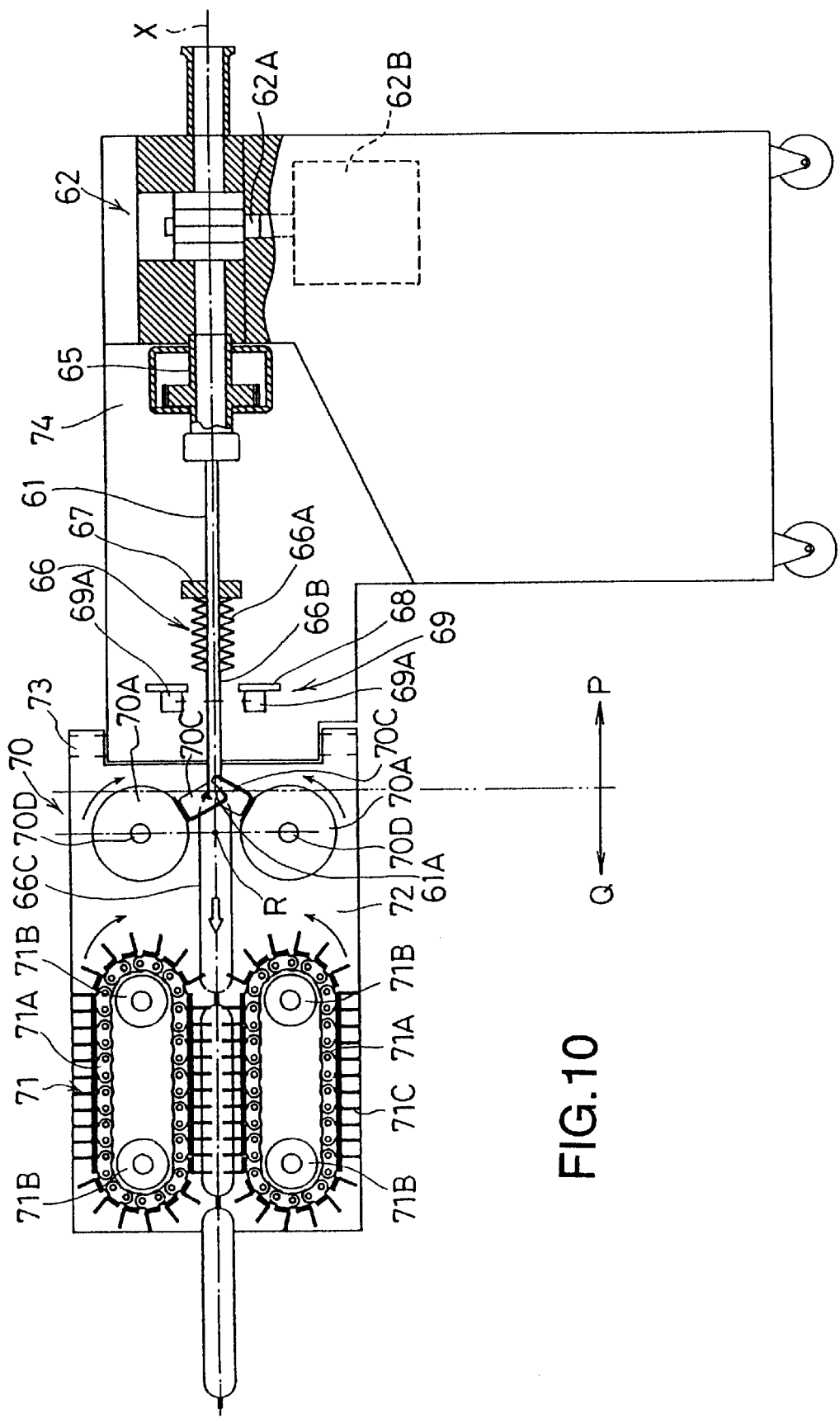
FIG. 10 is a partly cutaway front elevational view illustrating a further embodiment of the present invention.

This embodiment is similar to the embodiment shown in FIGS. 10 and 11 in that a desired twisting interval is obtained by setting the period of pinching by the pincher members 83A and 83B, as desired. In addition, since the pincher members 83A and 83B pinching a stuffed natural intestine 89C have a linearly moving distance, it is desirable to set the moving speed of the flat belts 87A of the conveying device 87 and the linearly moving speed of the pincher members 83A and 83B to the same speed. A variable speed motor 90 for pinchers controls the pinching device 81 such that the two pairs of pincher members 83A and 83B alternately pinch the stuffed natural intestine 89C at a desired period, respectively, and the pinching pincher members 83A and 83B move at the same speed as the moving speed of the flat belts 87A. The variable motor 90 for pinchers constitutes a pinching-device driving mechanism.

It should be noted that, in the embodiment shown in FIGS. 13A and 13B, the pinching device 81 may be provided with the pair of chains 82 having only one pair of pincher members 83A. Here, the chains 82 and the sprockets 84 may be replaced by known endless members, such as timing belts and timing pulleys. According to these embodiments, since the pinchers 83 are provided with a linearly moving region, the pinching time becomes long, and the twisting can be provided more reliably.

Figure 14:
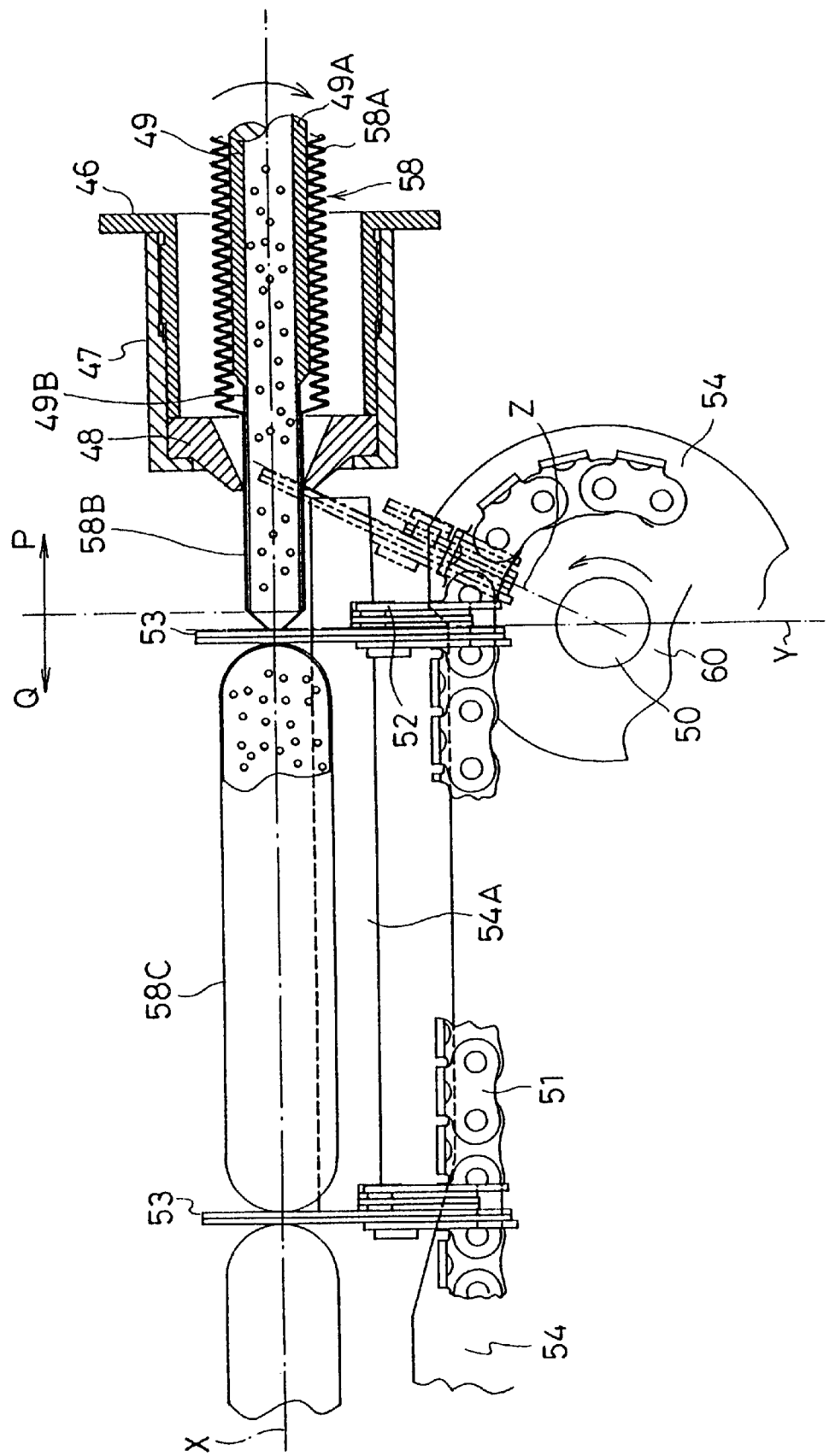
FIG. 14 is a partly cutaway plan view illustrating a still further embodiment of the present invention.
Figure 15:
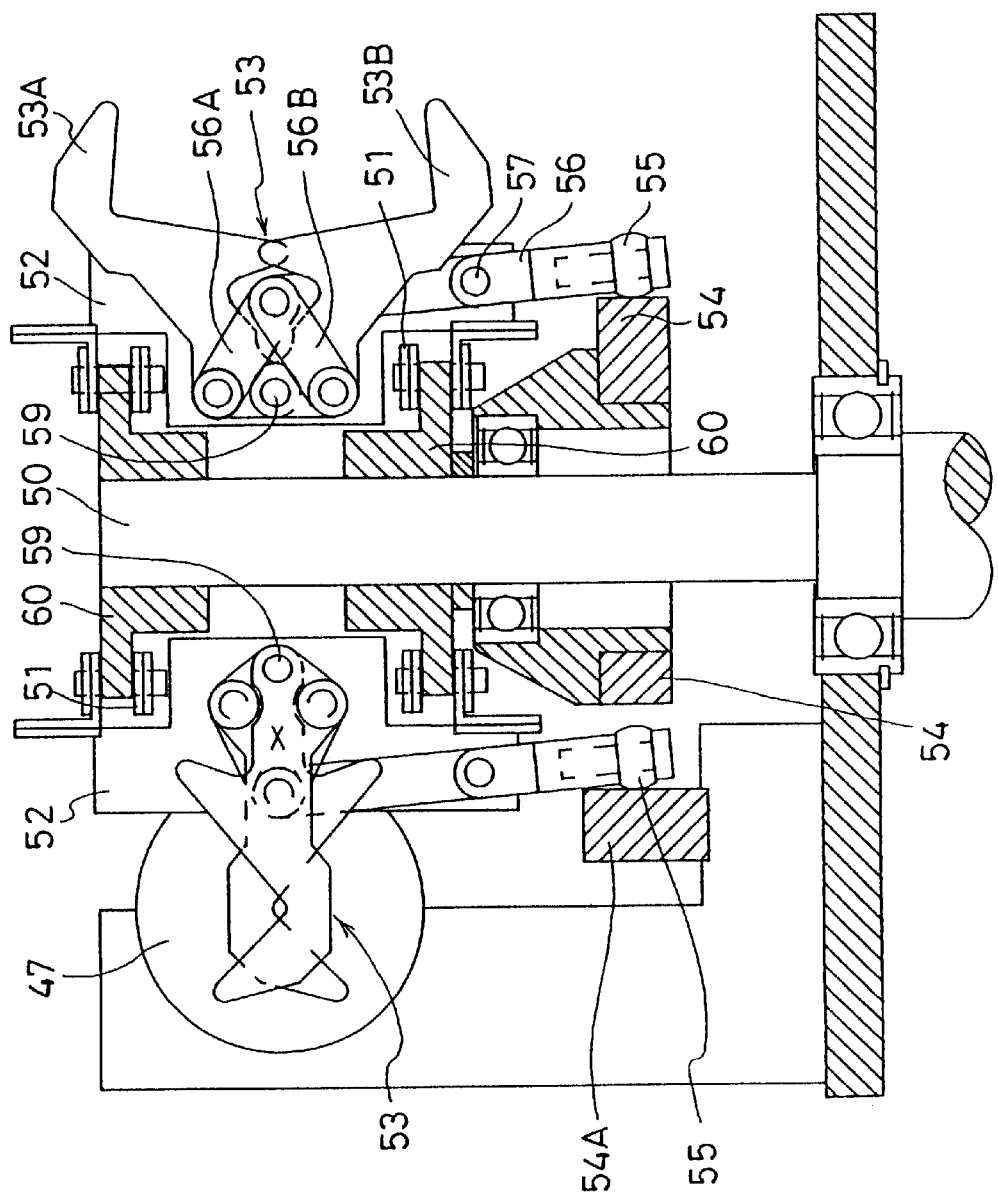
FIG. 15 is a partly cutaway side elevational view of FIG. 14.

The pinchers shown in the foregoing embodiments are of the type in which the stuffed natural intestine is pinched as a pair of opposing pincher members mesh with each other. However, in the present invention, it is possible to adopt opening/closing type pinchers such as those shown in FIGS. 14 and 15.

Pinchers 53 are each provided with a pair of pincher members 53A and 53B which can be opened and closed and are provided laterally of the axis X of a stuffing nozzle 49. The pinchers 53 are mounted on a moving means which is comprised of a pair of rotating shafts 50, two pairs of sprockets 60, a pair of endless chains 51, and brackets 52.

More specifically, brackets 52 are attached to the pair of chains 51 which rotate endlessly by meshing with the two pairs of sprockets 60 which are provided on the two vertically disposed rotating shafts 50 by being vertically spaced away from each other. The pinchers 53 are respectively attached to the brackets 52 in such a manner as to be capable of opening and closing.

The pincher 53 is opened and closed by a cam 54 and a cam 54A, respectively, and the opening and closing mechanism operates as described below.

A cam follower 55 is provided adjacent to the cam 54. The cam follower 55 is provided at an end of a swing lever 56. The lever 56 is rotated about a fulcrum 57. The pincher 53 is constituted by two pincher members 53A and 53B, and the pincher members 53A and 53B pinch a stuffed natural intestine 58C by intersecting each other like a pair of scissors.

The pincher members 53A and 53B are respectively connected to links 56A and 56B which are connected to an upper end of the lever 56. Each connection is provided by a pin.

The open state of the pincher members 53A and 53B is realized by the cam 54, while the closed state thereof is realized by the cam 54A. The position of completion of the closing of the pincher members 53A and 53B is immediately close to an axis Y passing through the rotating shaft 50, which is the center of movement of the pinchers. The distal end (the discharge end) of a stuffing nozzle 49 is at a position located in proximity to the axis Y.

In this embodiment, a braking member 48 serving as the engaging member is accommodated in a bracket 47, and a holding member 46 fixes the braking member 48 with respect to the axial direction. The diameter of the hole of the braking member 48 is set to be the same as or smaller than the outside diameter of the stuffing nozzle 49, and the braking member 48 is rotated in the bracket 47 together with the stuffing nozzle 49 due to the rotation of the stuffing nozzle 49.

A description will be given of the operation. The swing lever 56 is swung by the cam follower 55 which moves by following the cam 54 and the cam 54A. The pincher members 53A and 53B are rotated about a fulcrum 59 by the swinging lever 56. As a result, the pincher members 53A and 53B pinch the stuffed natural intestine 58C. When the pincher 53 which is set in the open position by the cam 54 reaches a Z position, the closing operation by the cam 54A is started at this point of time, and the pincher 53 is fully closed virtually on the axis Y.

Reference numeral 49 denotes the stuffing nozzle having the shape of a round pipe and provided with a large-diameter portion 49A and a small-diameter portion 49B. A shirred natural intestine portion 58A of the natural intestine 58 is fitted over the large-diameter portion 49A, while a straightened natural intestine portion 58B is fitted over the small-diameter portion 49B. According to this stuffing nozzle 49, since the gap with the shirred natural intestine portion 58A is small, the rotation of the stuffing nozzle 49 is liable to be imparted to the shirred natural intestine portion.

Since the other structures are substantially similar to those of the foregoing embodiments, a description thereof will be omitted.

The method using the opening/closing pinchers 53 of this cam type make it possible to start pinching the stuffed natural intestine 58C immediately in front of the distal end of the stuffing nozzle, and minimize the moving distance of the pincher up to the completion of pinching. In addition, this method makes it possible to eliminate variations in the position of the linked portion, and improve the quality of sausage products.

In the present invention, the operation of the stuffing pump, the stuffing nozzle, the pinching device, and the conveying device is not confined to those of the above-described embodiments. For example, it is possible to adopt a form which will be described below.

In the apparatus of the embodiments shown in FIGS. 1 to 9 and FIGS. 14 and 15, the stuffing pump may be intermittently driven with respect to the continuously moving pinchers to intermittently discharge the stuffing material. Alternatively, the intermittent driving of the stuffing pump may be synchronized with the intermittently moving pinchers to intermittently discharge the stuffing material. As for the rotating state of the stuffing nozzle, it is possible to adopt either the continuously rotating state or the intermittently rotating state.

In the apparatus of the embodiments shown in FIGS. 11 to 13B, the stuffing pump may be intermittently driven with respect to the continuously moving conveying device to intermittently discharge the stuffing material. Alternatively, the intermittent driving of the stuffing pump may be synchronized with the intermittently moving conveying device to intermittently discharge the stuffing material. The rotating state of the stuffing nozzle is not restricted, as described above.

In the present invention, it is possible to adopt various variable speed motors (including variable motors with speed reducing gears) as the motor for driving the stuffing pump, the motor for rotating the stuffing nozzle, the motor for rotating the engaging member (braking member), the motor for driving the pinching device, and the motor for driving the conveying device. These variable speed motors are, for example, servo motors or inverter-controlled motors, and are provided with known speed changing means for changing the number of revolutions of the motors.

In accordance with the present invention, as a rotational force is imparted to the natural intestine with its diameter reduced on the stuffing nozzle through cooperation between the rotating stuffing nozzle and the rotating engaging member, it is possible to manufacture at high speed novel fixed-size, fixed-volume products which have good shapes and in which variations in the stuffed diameter and the stuffed tension are small, although they are natural-intestine sausages.

In the embodiment shown in FIG. 10, the engaging member is not fitted to the stuffing nozzle 61. In the present invention, the embodiment shown in FIG. 10 can be provided with the structure in which, as shown in FIG. 16, a stuffing nozzle 141 is passed through a braking member 142 serving as the engaging member, and the point of engagement between the braking member 142 and a natural intestine 143A with its diameter reduced on the stuffing nozzle 141 is located rearwardly of a line KC perpendicular to the axis X of the stuffing nozzle on a point B of intersection between a center line Y of movement of a pincher member 147A, which is parallel to the axis X of the stuffing nozzle, and a circle L of the path of movement of the distal end of the pincher member 147A.

To give a more detailed description, the stuffing nozzle 141 is rotated by the unillustrated rotating means, and the natural intestine 143 is fitted over the stuffing nozzle 141. A pushing member 144 for pushing the natural intestine 143 toward the distal end side of the stuffing nozzle 141 is provided in such a manner as to be movable on the stuffing nozzle 141. The pushing member 144 is arranged to be pushed manually, but may be made to effect a mechanical pushing operation by means of an air cylinder or the like. In addition, the braking member 142 is fitted over a distal end side of the stuffing nozzle 141. The braking member 142 is mounted on a movable bed 146 which is provided in such a manner as to be capable of moving toward or away from a housing 145 in the directions indicated by arrows P and Q in the drawing. A pincher 147, which is comprised of the pair of pincher members 147A, is provided on the movable bed 146. The pincher members 147A are rotated in the direction of arrow R in the drawing. The braking member 142 is rotatably provided in such a manner as to rotate by accompanying the rotation of the stuffing nozzle 141. The braking member 142 is rotatably held in a bracket 148 which is fixed to the movable bed 146. It should be noted that the braking member 142 is not limited to the one which is rotatably provided, and may adopt a fixed structure. Still alternatively, an arrangement may be provided such that a rotatively driving mechanism, such as the one shown in FIG. 5, 7, or 9, whereby the braking member 142 is rotated about the axis X of the stuffing nozzle 141 is provided on the movable bed 146, and the braking member 142 is rotatively driven by this rotatively driving mechanism.

The distal end of the stuffing nozzle 141 is passed through the braking member 142 and extends to the position on the illustrated perpendicular line K. The circle L of the path of movement of the distal end of the pincher member 147A is a circle in which, with the line K set as a boundary, the distal end of the pincher member 147A enters a rearward region H located rearwardly of the perpendicular line K from a forward region G located forwardly thereof, and then moves into the forward region G. The braking member 142 is arranged such that the point of engagement between the braking member 142 and the natural intestine with its diameter reduced is located on the outer side of the rearmost position KC of the circle L of the path of movement of the distal end of the pincher member 147A in the rearward region H.

The apparatus of this embodiment shown in FIG. 16 is arranged such that the circle L of the path of movement of the distal end of the pincher member 147A intersects the outer periphery of the stuffing nozzle 141, and a circle M of the path of movement of the trough of a notched portion 147A1 of the pincher member 147A is in an immediate vicinity of the distal end of the stuffing nozzle 141. According to this arrangement, the position where the stuffed natural intestine starts to be pinched by the pincher members 147A can be made closer to the distal end of the stuffing nozzle 141.

In the embodiment shown in FIG. 16, since a braking force is imparted to a straightened natural-intestine portion 143A by the braking member 142, as compared with the embodiment shown in FIG. 10, close contact of the natural intestine 143 with respect to the stuffing nozzle 141 due to the reduction of the diameter of the natural intestine 143 is further improved. Further, in accordance with this embodiment, since the distance between the braking member 142 and the distal end of the stuffing nozzle 141 is fixed, even if a shirred natural-intestine portion 143B is constantly pushed against the braking member 142 by the pushing member 144, the length of the straightened natural-intestine portion 143A can be managed reliably. Accordingly, the shirred natural-intestine portion 143B can be pushed roughly by the pushing member 144.

In addition, when the natural intestine is fitted over the stuffing nozzle 141, the natural-intestine fitting operation can be effected simply after moving the movable bed 146 in the direction away from the housing 145 (in the direction of arrow P in the drawing). It should be noted that the braking member 142 is not limited to the structure in which, with a very small gap provided between the inner periphery of the hole of the braking member 142 and the outer periphery of the stuffing nozzle 141, a braking force is imparted to the straightened natural-intestine portion 143A being pulled out from the stuffing nozzle 141. Alternatively, a structure may be adopted such that, with a relatively large gap provided between the inner periphery of the hole of the braking member 142 and the outer periphery of the stuffing nozzle 141, the braking member 142 engages the outer surface of the natural intestine 143 so as to smooth out the shirred natural-intestine portion 143B reliably into the straightened natural-intestine portion 143A.

The pinching device in the apparatus of the embodiment shown in FIG. 16 is provided with a pair of rotating shafts 149 each adapted to rotate about a center A of movement of the pincher member 147A as well as the pair of pinching members 147A each secured to a rotating member 149A provided on the rotating shaft 149.

In the embodiment shown in FIG. 16, the structure provided is such that the distal end of the stuffing nozzle 141 is passed through the braking member 142 and extends to the pincher 147 side. However, the embodiment shown in FIG. 16 may be arranged such that, as shown in FIG. 17, a stuffing nozzle 151 is passed through a braking member 152, and the point of engagement between the braking member 142 and a natural intestine 153A with its diameter reduced on the stuffing nozzle 151 is located forwardly of the line KC perpendicular to the axis X of the stuffing nozzle on the point B of intersection between the center line Y of movement of a pincher member 157A, which is parallel to the axis X of the stuffing nozzle, and the circle L of the path of movement of the distal end of the pincher member 157A.

To give a more detailed description, the stuffing nozzle 151 is rotated by the unillustrated rotating means, and the natural intestine 153 is fitted over the stuffing nozzle 151. A pushing member 154 for pushing the natural intestine 153 toward the distal end side of the stuffing nozzle 151 is provided in such a manner as to be movable on the stuffing nozzle 151. The pushing member 154 is arranged to be pushed manually, but may be made to effect a mechanical pushing operation by means of an air cylinder or the like. In addition, the braking member 152 is fitted over a substantially distal end of the stuffing nozzle 151. The braking member 152 is mounted on a movable bed 156 which is provided in such a manner as to be capable of moving toward or away from a housing 155 in the directions indicated by arrows P and Q in the drawing. A pincher 157, which is comprised of the pair of pincher members 157A, is provided on the movable bed 156. The pincher members 157A are rotated in the direction of arrow R in the drawing. The braking member 152 is rotatably provided inside a bracket 158 in such a manner as to rotate by accompanying the rotation of the stuffing nozzle 151. It should be noted that the braking member 152 is not limited to the one which is so provided as to be rotatable by the stuffing nozzle 151, and may adopt the structure in which the braking member 152 is rotated by a rotatively driving mechanism, in the same way as the embodiment shown in FIG. 16.

The distal end of the stuffing nozzle 151 is passed through the braking member 152 and extends to the position on the illustrated line K1 perpendicular to the axis X of the stuffing nozzle. The circle L of the path of movement of the distal end of the pincher member 157A is a circle in which, with the line K1 set as a boundary, the distal end of the pincher member 157A enters the rearward region H located rearwardly of the line K1 from the forward region G located forwardly thereof, and then moves into the forward region G. The braking member 152 is arranged such that the point of engagement between the braking member 152 and the natural intestine 153A with its diameter reduced is located on the inner side of the rearmost position KC of the circle L of the path of movement of the distal end of the pincher member 157A in the rearward region H, i.e., the point of engagement is located at a position closer to the position K1.

The apparatus of this embodiment shown in FIG. 17 is arranged such that the circle L of the path of movement of the distal end of the pincher member 157A does not intersect the outer periphery of the stuffing nozzle 151, and the circle M of the path of movement of the trough of a notched portion 157A1 of the pincher member 157A is remote from the distal end of the stuffing nozzle 151.

In the embodiment shown in FIG. 17, there are cases where the length of a straightened natural-intestine portion 153A with its diameter reduced is very short, in which case sufficient rotatively driving force fails to be imparted to the short straightened natural-intestine portion 153A to rotate the stuffed natural intestine. However, the rotatively driving force can be increased by the use of the braking member 152, thereby making it possible to sufficiently rotate the stuffed natural intestine. Further, the action of pushing a shirred natural-intestine portion 153B toward the braking member 152 side by the pushing member 134 can take place simply and easily. The reason for this is that even if the shirred natural-intestine portion 153B is pushed roughly, the end of the advancing movement of the shirred natural-intestine portion 153B is fixed by the braking member 152.

In addition, when the natural intestine is fitted over the stuffing nozzle 151, the natural-intestine fitting operation can be effected simply after moving the movable bed 156 in the direction away from the housing 155 (in the direction of arrow P in the drawing).

In the apparatus of the embodiments shown in FIGS. 16 and 17 as well, the following advantages are obtained in the same way as the other embodiments. Namely, in the apparatus of these embodiments, twisting can be caused to occur easily and reliably in the stuffed natural intestine since pinching is started at a position where the rotation of the rotating stuffing nozzle is liable to be transmitted, and in the vicinity of the distal end of the stuffing nozzle which is a position very close to the position of the boundary between the distal end of the stuffing nozzle having very large rigidity and the stuffed natural intestine having very small rigidity. In addition, there are many cases where the diameter of the stuffed natural intestine which is at this pinching starting position is normally still small, the occurrence of twisting is further facilitated. Furthermore, a situation can occur in which the straightened natural-intestine portion with its diameter reduced on the stuffing nozzle becomes detached from the outer surface of the stuffing nozzle, because the diameter of the stuffed natural intestine in the vicinity of the distal end of the stuffing nozzle happens to become large or the stuffing material flows backward in the direction of the stuffing nozzle due to the relationship between the conveying speed for conveying the stuffed natural intestine and the discharge rate for discharging the scuffing material or due to the pinching of the stuffed natural intestine. Even in such a case, however, a desired rotating force can be imparted to the natural intestine with its diameter reduced on the stuffing nozzle through cooperation between the rotating stuffing nozzle and the rotating engaging member, with the result that twisting is allowed to occur reliably in the stuffed natural intestine.

Incidentally, as the pinching device in the apparatus of each of the embodiments shown in FIGS. 16 and 17, it is possible to use the same pinching device as the one used in the apparatus of the embodiment shown in FIG. 10.

In the embodiment shown in FIG. 7, the point of engagement between the braking member 122 serving as the engaging member and the straightened natural-intestine portion 154B with its diameter reduced on the stuffing nozzle 103 is located rearwardly (on the P-direction side) of the perpendicular line KC. In addition, the arrangement provided is such that the circle L of the path of movement of the distal end of the pincher member 129A intersects the outer periphery of the stuffing nozzle 103, and that the circle M of the path of movement of the trough of a notched portion 129A1 of the pincher member 129 is located forwardly of and very close to the distal end of the stuffing nozzle 103.

Figure 18:
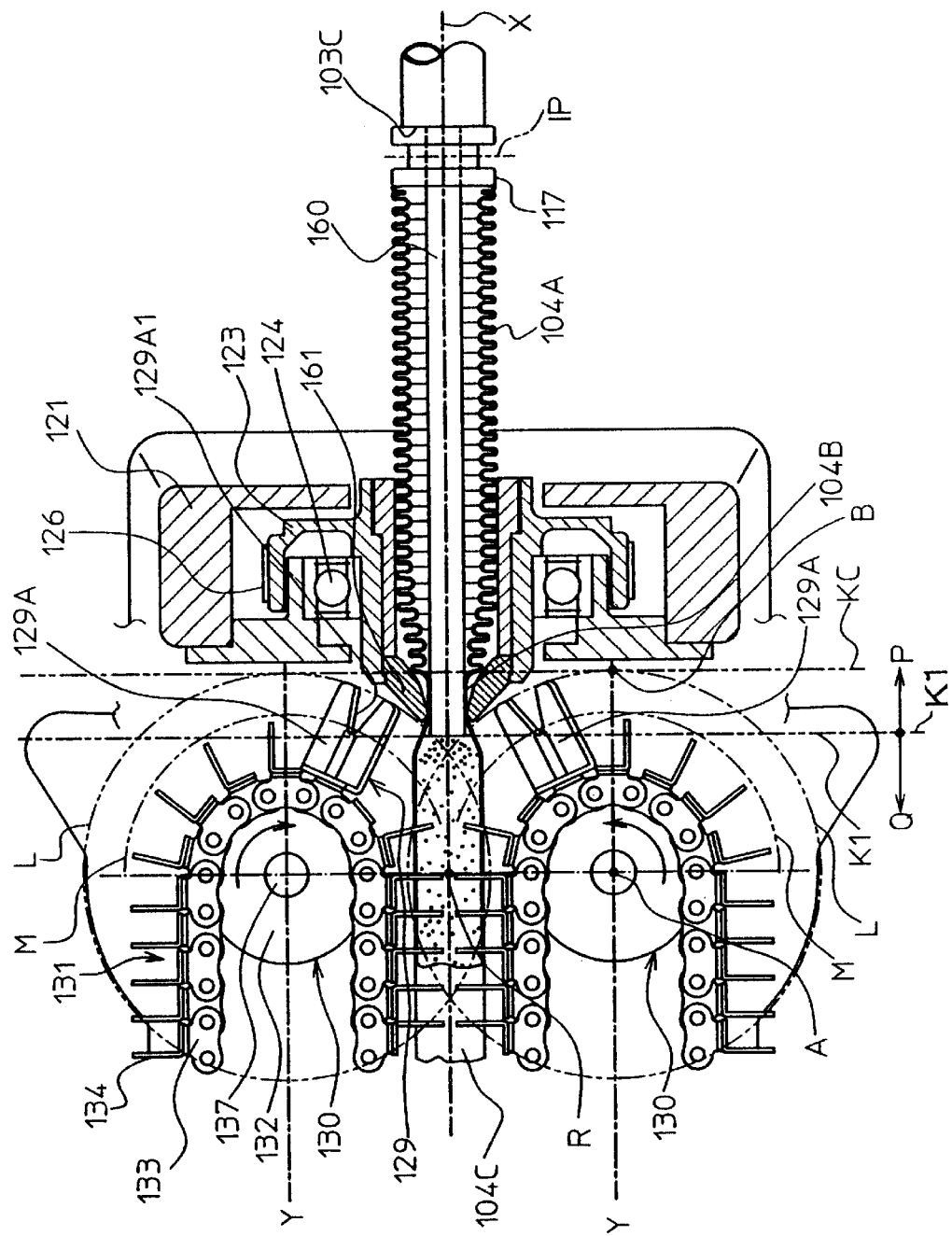
FIG. 18 is a plan view illustrating a further embodiment of the present invention in which the arrangement of the stuffing nozzle and the engaging member mainly differs from that of the apparatus shown in FIG. 7.

In the present invention, the embodiment shown in FIG. 7 may be arranged as an embodiment shown in FIG. 18, wherein a stuffing nozzle 160 is passed through a braking member 161 serving as the engaging member, and the point of engagement between the braking member 161 and the straightened natural-intestine portion 104B with its diameter reduced on the stuffing nozzle 160 is located forwardly (on the Q-direction side) of the perpendicular line KC, such that the circle L of the path of movement of the distal end of the pincher member 129A does not intersect the outer periphery of the stuffing nozzle 160, and the circle M of the path of movement of the trough of a notched portion 129A1 of the pincher member 129A is located forwardly of and remotely from the distal end of the stuffing nozzle 160.

In the apparatus of this embodiment, the distal end of the stuffing nozzle 160 is passed through the braking member 161, i.e., a hollow conical member having a conical center hole, and is located at the illustrated position K1, and the distance between each rotating shaft 137 and the position K1 is longer than the distance between the illustrated K and the rotating shaft 137 in the embodiment shown in FIG. 7. In addition, since the aforementioned point of engagement between the straightened natural-intestine portion 104B and the braking member 161 is located forwardly of the perpendicular line KC, the distance from that point of engagement to the distal end of the stuffing nozzle 160 in the apparatus of this embodiment is shorter than that in the embodiment shown in FIG. 7.

In the apparatus of this embodiment, a situation can occur in which the length of the straightened natural-intestine portion 104B with its diameter reduced is short and the straightened natural-intestine portion 104B with its diameter reduced becomes detached from the outer surface of the stuffing nozzle 160 for the same reasons as described in the embodiments shown in FIGS. 16 and 17. Even in such a case, however, a desired rotating force can be imparted to the straightened natural-intestine 104B with its diameter reduced on the stuffing nozzle 160 through cooperation between the rotating stuffing nozzle 160 and the rotating braking member 161, with the result that twisting is allowed to occur reliably in the stuffed natural intestine 104C.

The distance between the distal end of the stuffing nozzle 103 or 160 and the rotating shaft 137 which rotates about the center A of movement of the pincher member 129A, as well as the length of the straightened natural-intestine portion 104B with its diameter reduced, can be adjusted depending on the difficulty of producing the twist in the stuffed natural intestine 104C or the difficulty for the straightened natural-intestine portion to slide on the stuffing nozzle 103 or 160.

It should be noted that, in the apparatus of this embodiment, the arrangement of the center line Y of movement of the pincher member and the point B of intersection between the center line Y of movement of the pincher member and the circle L of the path of movement of the distal end of the pincher member is similar to the arrangements shown in FIGS. 16 and 17.

What is claimed is:

1. A method for manufacturing chain-like food products such as sausages or the like, comprising the steps of:

pinching a stuffed natural intestine portion;

pulling the stuffed natural intestine portion so as to reduce the diameter of an inner peripheral surface of an unstuffed straightened natural intestine portion following the stuffed natural intestine portion; and supplying a stuffing material into the unstuffed straightened natural intestine portion to form the stuffed natural intestine portion, holding in a cylindrical shape the inner peripheral surface of the unstuffed straightened natural intestine portion with the diameter thereof reduced, imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and forming a twist in a pinched portion of the stuffed natural intestine portion.

2. An apparatus for manufacturing chain-like food products such as sausages or the like, comprising:

means for pinching a stuffed natural intestine portion and pulling the stuffed natural intestine portion so as to reduce the diameter of an inner peripheral surface of an unstuffed straightened natural intestine portion following the stuffed natural intestine portion; and means for supplying a stuffing material into the unstuffed straightened natural intestine portion to form the stuffed natural intestine portion, for holding in a cylindrical shape the inner peripheral surface of the unstuffed straightened natural intestine portion with the diameter thereof reduced, for imparting a rotational force to the inner peripheral surface of the unstuffed straightened natural intestine portion held in the cylindrical shape so as to rotate the stuffed natural intestine portion preceding the unstuffed straightened natural intestine portion via the unstuffed straightened natural intestine portion, and for forming a twist in a pinched portion of the stuffed natural intestine portion.

3. An apparatus for manufacturing chain-like food products such as sausages or the like, comprising:

a stuffing nozzle over which a natural intestine is fitted and which is adapted to discharge a stuffing material into the natural intestine;

means for conveying the stuffed natural intestine with the stuffing material stuffed therein in a forward direction of said stuffing nozzle at a predetermined speed, and stretching the natural intestine by means of this conveyance so as to pull the natural intestine fitted over said stuffing nozzle;

an engaging member having an engaging hole through which said stuffing nozzle is inserted, for engaging in said engaging hole an outer surface of the natural intestine fitted over said stuffing nozzle;

pinching means having a pair of pincher members which are moved in such a manner as to pinch the stuffed natural intestine at predetermined periods;

means for rotating said stuffing nozzle with which the natural intestine has been brought into contact, and which is inserted through the engaging hole of said engaging member, so as to form a twist in a pinched portion of the stuffed natural intestine by rotating the stuffed natural intestine; and means for supplying the stuffing material into said stuffing nozzle so as to discharge the stuffing material into the natural intestine being pulled out from a distal end of said stuffing nozzle by the stuffed natural intestine being conveyed at the predetermined speed, wherein a distal end of each of said pincher members is disposed such that a center of movement thereof is located laterally of an axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine on said stuffing nozzle is located rearwardly of a line perpendicular to the axis of the stuffing nozzle on a point of intersection between a center line of movement of said pincher member, which is parallel to the axis of said stuffing nozzle, and a circle of a path of movement of the distal end of said pincher member.

4. An apparatus for manufacturing chain-like food products such as sausages or the like, comprising:

a stuffing nozzle over which a natural intestine is fitted and which is adapted to discharge a stuffing material into the natural intestine;

means for conveying the stuffed natural intestine with the stuffing material stuffed therein in a forward direction of said stuffing nozzle at a predetermined speed, and stretching the natural intestine by means of this conveyance so as to pull the natural intestine fitted over said stuffing nozzle;

an engaging member having an engaging hole through which said stuffing nozzle is inserted, for engaging in said engaging hole an outer surface of the natural intestine fitted over said stuffing nozzle;

pinching means having a pair of pincher members which are moved in such a manner as to pinch the stuffed natural intestine at predetermined periods;

means for rotating said stuffing nozzle with which the natural intestine has been brought into contact, and which is inserted through the engaging hole of said engaging member, so as to form a twist in a pinched portion of the stuffed natural intestine by rotating the stuffed natural intestine; and means for supplying the stuffing material into said stuffing nozzle so as to discharge the stuffing material into the natural intestine being pulled out from a distal end of said stuffing nozzle by the stuffed natural intestine being conveyed at the predetermined speed, wherein a distal end of each of said pincher members is disposed such that a center of movement thereof is located laterally of an axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine on said stuffing nozzle is located forwardly of a line perpendicular to the axis of the stuffing nozzle on a point of intersection between a center line of movement of said pincher member, which is parallel to the axis of said stuffing nozzle, and a circle of a path of movement of the distal end of said pincher member.

5. A method for manufacturing chain-like food products such as sausages or the like, comprising the steps of:

conveying a stuffed natural intestine stuffed with a stuffing material in a natural intestine, to pull and move an unstuffed natural intestine following the stuffed natural intestine while applying a braking force to an outer surface of the unstuffed natural intestine, so as to stretch the natural intestine and reduce a diameter of an inner surface of the unstuffed natural intestine; and discharging a stuffing material into the unstuffed natural intestine with the diameter thereof reduced which moves by being pulled by the stuffed natural intestine, to form the stuffed natural intestine, holding in a cylindrical shape the inner surface of the unstuffed natural intestine with the diameter thereof reduced, imparting a rotational force to the inner surface of the unstuffed natural intestine held in the cylindrical shape so as to rotate the stuffed natural intestine preceding the unstuffed natural intestine via the unstuffed natural intestine with the diameter thereof reduced, and forming a twist in a pinched portion of the stuffed natural intestine.

6. An apparatus for manufacturing chain-like food products such as sausages or the like, comprising:

means for conveying a stuffed natural intestine stuffed with a stuffing material in a natural intestine, to pull and move an unstuffed natural intestine following the stuffed natural intestine while applying a braking force to an outer surface of the unstuffed natural intestine, so as to stretch the natural intestine and reduce a diameter of an inner surface of the unstuffed natural intestine; and means for discharging a stuffing material into the unstuffed natural intestine with the diameter thereof reduced which moves by being pulled by the stuffed natural intestine, to form the stuffed natural intestine, for holding in a cylindrical shape the inner surface of the unstuffed natural intestine with the diameter thereof reduced, for imparting a rotational force to the inner surface of the unstuffed natural intestine held in the cylindrical shape so as to rotate the stuffed natural intestine preceding the unstuffed natural intestine via the unstuffed natural intestine with the diameter thereof reduced, and for forming a twist in a pinched portion of the stuffed natural intestine.

7. A method for manufacturing chain-like food products such as sausages or the like, comprising the steps of:

conveying a stuffed natural intestine stuffed with a stuffing material in a natural intestine, to pull and move an unstuffed natural intestine following the stuffed natural intestine while applying a braking force to an outer surface of the unstuffed natural intestine, so as to stretch the natural intestine and reduce a diameter of an inner surface of the unstuffed natural intestine; and discharging a stuffing material into the unstuffed natural intestine with the diameter thereof reduced which moves by being pulled by the stuffed natural intestine, to form the stuffed natural intestine, imparting a rotational force to the inner surface and the outer surface of the unstuffed natural intestine held in the cylindrical shape so as to rotate the stuffed natural intestine preceding the unstuffed natural intestine via the unstuffed natural intestine with the diameter thereof reduced, and forming a twist in a pinched portion of the stuffed natural intestine.

8. An apparatus for manufacturing chain-like food products such as sausages or the like, comprising:

means for conveying a stuffed natural intestine stuffed with a stuffing material in a natural intestine, to pull and move an unstuffed natural intestine following the stuffed natural intestine while applying a braking force to an outer surface of the unstuffed natural intestine, so as to stretch the natural intestine and reduce a diameter of an inner surface of the unstuffed natural intestine; and means for discharging a stuffing material into the unstuffed natural intestine with the diameter thereof reduced which moves by being pulled by the stuffed natural intestine, to form the stuffed natural intestine, for imparting a rotational force to the inner surface and the outer surface of the unstuffed natural intestine held in the cylindrical shape so as to rotate the stuffed natural intestine preceding the unstuffed natural intestine via the unstuffed natural intestine with the diameter thereof reduced, and for forming a twist in a pinched portion of the stuffed natural intestine.

9. A method for manufacturing chain-like food products such as sausages or the like according to claim 5 or 7, further comprising the step of:

starting the pinching of the stuffed natural intestine having a smaller stuffed diameter than a maximum stuffed diameter of the stuffed natural intestine for which the formation of twists at opposite ends has been completed.

10. An apparatus for manufacturing chain-like food products such as sausages or the like, comprising:

a stuffing nozzle over which a natural intestine is fitted and which is adapted to discharge a stuffing material into the natural intestine;

means for conveying the stuffed natural intestine with the stuffing material stuffed therein in a forward direction of said stuffing nozzle at a predetermined speed;

means for pulling and moving the natural intestine on said stuffing nozzle by the stuffed natural intestine being conveyed at the predetermined speed, so as to stretch the natural intestine, reduce a diameter of the natural intestine, and cause the natural intestine to come into contact with an outer peripheral surface of said stuffing nozzle;

means for pinching the stuffed natural intestine at predetermined periods;

means for rotating said stuffing nozzle with which the natural intestine with the diameter thereof reduced has been brought into contact, so as to form a twist in a pinched portion of the stuffed natural intestine by rotating the stuffed natural intestine; and means for supplying the stuffing material into said stuffing nozzle so as to discharge the stuffing material into the natural intestine whose diameter has been reduced on said stuffing nozzle and which is being pulled out from a distal end of said stuffing nozzle by the stuffed natural intestine being conveyed at the predetermined speed.

11. A method for manufacturing chain-like food products such as sausages or the like, comprising the steps of:

discharging a stuffing material into a natural intestine from a distal end of a stuffing nozzle to form a stuffed natural intestine forwardly of the distal end of said stuffing nozzle;

conveying the stuffed natural intestine in a forward direction of said stuffing nozzle at a predetermined speed;

pulling and moving the natural intestine on said stuffing nozzle by the stuffed natural intestine being conveyed at the predetermined speed, while causing an engaging member through which said stuffing nozzle is inserted to engage the natural intestine on said stuffing nozzle;

pulling and moving the natural intestine on said stuffing nozzle by the stuffed natural intestine being conveyed at the predetermined speed, so as to stretch the natural intestine, reduce a diameter of the natural intestine, and cause the natural intestine to come into contact with an outer peripheral surface of said stuffing nozzle;

pinching the stuffed natural intestine at predetermined periods; and rotating the stuffed natural intestine by the natural intestine fitted over said stuffing nozzle and brought into contact with said stuffing nozzle being rotated and with said engaging member being rotated, so as to form a twist in a pinched portion of the stuffed natural intestine, wherein the discharge of the stuffing material into the natural intestine is effected while the natural intestine with the diameter thereof reduced on said stuffing nozzle is pulled out from the distal end of said stuffing nozzle by the stuffed natural intestine being conveyed at the predetermined speed.

12. An apparatus for manufacturing chain-like food products such as sausages or the like, comprising:

a stuffing nozzle over which a natural intestine is fitted and which is adapted to discharge a stuffing material into the natural intestine;

means for conveying the stuffed natural intestine with the stuffing material stuffed therein in a forward direction of said stuffing nozzle at a predetermined speed;

an engaging member having an engaging hole through which said stuffing nozzle is inserted, for engaging in said engaging hole an outer surface of the natural intestine fitted over said stuffing nozzle;

means for pinching the stuffed natural intestine at predetermined periods;

means for pulling and moving the natural intestine on said stuffing nozzle by the stuffed natural intestine being conveyed at the predetermined speed, so as to stretch the natural intestine, reduce a diameter of the natural intestine, and cause the natural intestine to come into contact with an outer peripheral surface of said stuffing nozzle;

means for rotating said stuffing nozzle with which the natural intestine has been brought into contact, and which is inserted through the engaging hole of said engaging member, so as to form a twist in a pinched portion of the stuffed natural intestine by rotating the stuffed natural intestine; and means for supplying the stuffing material into said stuffing nozzle so as to discharge the stuffing material into the natural intestine whose diameter has been reduced on said stuffing nozzle and which is being pulled out from a distal end of said stuffing nozzle by the stuffed natural intestine being conveyed at the predetermined speed.

13. A method for manufacturing chain-like food products such as sausages or the like, comprising the steps of:

discharging a stuffing material into a natural intestine from a distal end of a stuffing nozzle to form a stuffed natural intestine forwardly of the distal end of said stuffing nozzle;

conveying the stuffed natural intestine in a forward direction of said stuffing nozzle at a predetermined speed while nipping the stuffed natural intestine;

pulling and moving the natural intestine on said stuffing nozzle by the stuffed natural intestine being conveyed at the predetermined speed, while causing an engaging member through which said stuffing nozzle is inserted to engage an outer surface of the natural intestine on said stuffing nozzle;

pulling and moving the natural intestine on said stuffing nozzle by the stuffed natural intestine being conveyed at the predetermined speed, so as to stretch the natural intestine, reduce a diameter of the natural intestine, and cause the natural intestine to come into contact with an outer peripheral surface of said stuffing nozzle;

causing the stuffed natural intestine being conveyed at the predetermined speed to be pinched at a predetermined position at predetermined periods; and rotating the stuffed natural intestine by the natural intestine fitted over said stuffing nozzle and brought into contact with said stuffing nozzle being rotated and with said engaging member being rotated, so as to form a twist in a pinched portion of the stuffed natural intestine, wherein the discharge of the stuffing material into the natural intestine is effected while the natural intestine with the diameter thereof reduced on said stuffing nozzle is pulled out from the distal end of said stuffing nozzle by the stuffed natural intestine being conveyed at the predetermined speed.

14. An apparatus for manufacturing chain-like food products such as sausages or the like, comprising:

a stuffing nozzle over which a natural intestine is fitted and which is adapted to discharge a stuffing material into the natural intestine;

a conveying device comprised of a wrapping connector means for conveying at a predetermined speed a stuffed natural intestine stuffed with the stuffing material in a forward direction of said stuffing nozzle while nipping the stuffed natural intestine, for pulling the natural intestine fitted over said stuffing nozzle by the conveyance, so as to stretch the natural intestine, reduce a diameter of the natural intestine, and cause the natural intestine with the diameter reduced to be brought into contact with an outer peripheral surface of said stuffing nozzle;

a pinching device disposed between said stuffing nozzle and said conveying device, and having a pincher comprised of a pair of pincher members for pinching the stuffed natural intestine being conveyed by said conveying device in a predetermined cycle and a pair of rotating shafts which are arranged at symmetrical positions about an axis of said stuffing nozzle and on which said pincher members are disposed;

an engaging member rotatable about said stuffing nozzle and having an engaging hole through which said stuffing nozzle is inserted, for engaging in said engaging hole an outer surface of the natural intestine fitted over said stuffing nozzle;

nozzle rotating means for rotating said stuffing nozzle with which the natural intestine has been brought into contact, and which is inserted through the engaging hole of said engaging member; and a stuffing pump for supplying the stuffing material into said stuffing nozzle so as to discharge the stuffing material into the natural intestine whose diameter has been reduced on said stuffing nozzle and which is being pulled out from a distal end of said stuffing nozzle by the stuffed natural intestine being conveyed by said conveying device.

15. An apparatus for manufacturing chain-like food products such as sausages or the like according to claim 14, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine with the diameter thereof reduced on said stuffing nozzle is located rearwardly of a line perpendicular to the axis of the stuffing nozzle on a point of intersection between a center line of movement of said pincher member, which is parallel to the axis of said stuffing nozzle, and a circle of a path of movement of the distal end of said pincher member.

16. An apparatus for manufacturing chain-like food products such as sausages or the like according to claim 14, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine with the diameter thereof reduced on said stuffing nozzle is located forwardly of a line perpendicular to the axis of the stuffing nozzle on a point of intersection between a center line of movement of said pincher member, which is parallel to the axis of said stuffing nozzle, and a circle of a path of movement of the distal end of said pincher member.

17. An apparatus for manufacturing chain-like food products such as sausages or the like, comprising:

a stuffing nozzle over which a natural intestine is fitted and which is adapted to discharge a stuffing material into the natural intestine;

a conveying device comprised of a wrapping connector means for conveying at a predetermined speed a stuffed natural intestine stuffed with the stuffing material in a forward direction of said stuffing nozzle while nipping the stuffed natural intestine, for pulling the natural intestine fitted over said stuffing nozzle by the conveyance, so as to stretch the natural intestine;

a pinching device disposed between said stuffing nozzle and said conveying device, and having a pincher comprised of a pair of pincher members for pinching the stuffed natural intestine being conveyed by said conveying device in a predetermined cycle and a pair of rotating shafts which are arranged at symmetrical positions about an axis of said stuffing nozzle and on which said pincher members are disposed;

an engaging member having an engaging hole through which said stuffing nozzle is inserted, for engaging in said engaging hole an outer surface of the natural intestine fitted over said stuffing nozzle;

nozzle rotating means for rotating said stuffing nozzle with which the natural intestine has been brought into contact, and which is inserted through the engaging hole of said engaging member; and a stuffing pump for supplying the stuffing material into said stuffing nozzle so as to discharge the stuffing material into the natural intestine being pulled out from a distal end of said stuffing nozzle by the stuffed natural intestine being conveyed by said conveying device, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine on said stuffing nozzle is located rearwardly of a line perpendicular to the axis of the stuffing nozzle on a point of intersection between a center line of movement of said pincher member, which is parallel to the axis of said stuffing nozzle, and a circle of a path of movement of the distal end of said pincher member.

18. An apparatus for manufacturing chain-like food products such as sausages or the like, comprising:

a stuffing nozzle over which a natural intestine is fitted and which is adapted to discharge a stuffing material into the natural intestine;

a conveying device comprised of a wrapping connector means for conveying at a predetermined speed a stuffed natural intestine stuffed with the stuffing material in a forward direction of said stuffing nozzle while nipping the stuffed natural intestine, for pulling the natural intestine fitted over said stuffing nozzle by the conveyance, so as to stretch the natural intestine;

a pinching device disposed between said stuffing nozzle and said conveying device, and having a pincher comprised of a pair of pincher members for pinching the stuffed natural intestine being conveyed by said conveying device in a predetermined cycle and a pair of rotating shafts which are arranged at symmetrical positions about an axis of said stuffing nozzle and on which said pincher members are disposed;

an engaging member having an engaging hole through which said stuffing nozzle is inserted, for engaging in said engaging hole an outer surface of the natural intestine fitted over said stuffing nozzle;

nozzle rotating means for rotating said stuffing nozzle with which the natural intestine has been brought into contact, and which is inserted through the engaging hole of said engaging member; and a stuffing pump for supplying the stuffing material into said stuffing nozzle so as to discharge the stuffing material into the natural intestine being pulled out from a distal end of said stuffing nozzle by the stuffed natural intestine being conveyed by said conveying device, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said Pincher members pinch the stuffed natural intestine, and said engaging member is disposed such that a point of engagement between said engaging member and the natural intestine on said stuffing nozzle is located forwardly of a line perpendicular to the axis of the stuffing nozzle on a point of intersection between a center line of movement of said pincher member, which is parallel to the axis of said stuffing nozzle, and a circle of a path of movement of the distal end of said pincher member.

19. An apparatus for manufacturing chain-like food products such as sausages or the like according to claim 3, 4, 17 or 18, wherein said engaging member is disposed rotatably about the axis of said stuffing nozzle.

20. An apparatus for manufacturing chain-like food products such as sausages or the like according to claim 19, further comprising a rotatably driving mechanism for rotating said engaging member about the axis of said stuffing nozzle.

21. An apparatus for manufacturing chain-like food products such as sausages or the like, comprising:

a stuffing nozzle over which a natural intestine is fitted and which is adapted to discharge a stuffing material continuously into the natural intestine;

a pinching device including a pincher, which is comprised of a pair of pincher members for consecutively pinching a stuffed natural intestine stuffed with the stuffing material, and pincher moving means having a wrapping connector menas which is adapted to move and on which said pincher members are disposed at a predetermined interval;

an engaging member having an engaging hole through which said stuffing nozzle is inserted, for engaging in said engaging hole an outer surface of the natural intestine fitted over said stuffing nozzle, said engaging member being rotatable about an axis of said stuffing nozzle;

nozzle rotating means for rotating said stuffing nozzle with which the natural intestine has been brought into contact, and which is inserted through the engaging hole of said engaging member; and a stuffing pump which is operated continuously for supplying the stuffing material into said stuffing nozzle so as to discharge the stuffing material into the natural intestine being stretched and pulled out from a distal end of said stuffing nozzle by the stuffed natural intestine which is conveyed by being pinched by said pincher of said pinching device moving continuously in a forward direction of said nozzle at a fixed speed, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine on said stuffing nozzle is located rearwardly of a line perpendicular to the axis of the stuffing nozzle on a point of intersection between a center line of movement of said pincher member, which is parallel to the axis of said stuffing nozzle, and a circle of a path of movement of the distal end of said pincher member.

22. An apparatus for manufacturing chain-like food products such as sausages or the like, comprising:

a stuffing nozzle over which a natural intestine is fitted and which is adapted to discharge a stuffing material continuously into the natural intestine;

a pinching device including a pincher, which is comprised of a pair of pincher members for consecutively pinching a stuffed natural intestine stuffed with the stuffing material, and pincher moving means having a wrapping connector means which is adapted to move and on which said pincher members are disposed at a predetermined interval;

an engaging member having an engaging hole through which said stuffing nozzle is inserted, for engaging in said engaging hole an outer surface of the natural intestine fitted over said stuffing nozzle, said engaging member being rotatable about an axis of said stuffing nozzle;

nozzle rotating means for rotating said stuffing nozzle with which the natural intestine has been brought into contact, and which is inserted through the engaging hole of said engaging member; and a stuffing pump which is operated continuously for supplying the stuffing material into said stuffing nozzle so as to discharge the stuffing material into the natural intestine being stretched and pulled out from a distal end of said stuffing nozzle by the stuffed natural intestine which is conveyed by being pinched by said pincher of said pinching device moving continuously in a forward direction of said nozzle at a fixed speed, wherein a distal end of each of said pincher members is disposed such that a center of movement thereof is located laterally of the axis of said stuffing nozzle, so that the distal ends of said pincher members move from a rearward region located rearwardly of the distal end of said stuffing nozzle to a forward region located forwardly thereof and so that said pincher members pinch the stuffed natural intestine, and said engaging member is disposed such that a point of engagement between said engaging member and the natural intestine on said stuffing nozzle is located forwardly of a line perpendicular to the axis of the stuffing nozzle on a point of intersection between a center line of movement of said pincher member, which is parallel to the axis of said stuffing nozzle, and a circle of a path of movement of the distal end of said pincher member.

23. An apparatus for manufacturing chain-like food products such as sausages or the like according to claim 21 or 22, further comprising a rotatably driving mechanism for rotating said engaging member about the axis of said stuffing nozzle.

24. An apparatus for manufacturing chain-like food products such as sausages or the like according to claim 3, 4, 17, 18, 21 or 22, wherein the natural intestine sectioned into a shirred natural intestine portion and a straightened natural intestine portion is fitted over said stuffing nozzle, and an outer circumferential dimension of the outer peripheral surface of said stuffing nozzle in its entire area in contact with said straightened natural intestine portion has a value lower than or equal to an inner circumferential dimension of the shirred natural intestine portion.

25. An apparatus for manufacturing chain-like food products such as sausages or the like according to claim 3, 4, 17, 18, 21 or 22, wherein the natural intestine sectioned into a shirred natural intestine portion and a straightened natural intestine portion is fitted over said stuffing nozzle, and an outside diameter of the outer peripheral surface of said stuffing nozzle in its entire area in contact with said straightened natural intestine portion has a value lower than or equal to an inside diameter of the shirred natural intestine portion.

26. An apparatus for manufacturing chain-like food products such as sausages or the like according to claim 3, 4, 17, 18, 21 or 22, wherein the natural intestine sectioned into a shirred natural intestine portion and a straightened natural intestine portion is fitted over said stuffing nozzle, said stuffing nozzle is formed by a tubular member having an identical cross-sectional shape and an identical sectional dimension in its entire area in contact with said straightened natural intestine, and an outside diameter of said tubular member is less than or equal to an inside diameter of the shirred natural intestine portion.

27. An apparatus for manufacturing chain-like food products such as sausages or the like, comprising:

a stuffing nozzle over which a natural intestine is fitted and which is adapted to discharge a stuffing material into the natural intestine;

a pinching device including a pincher, which is comprised of a pair of pincher members for consecutively pinching a stuffed natural intestine stuffed with the stuffing material, and pincher moving means having a wrapping connector means which is adapted to move and on which said pincher members are disposed at a predetermined interval;

an engaging member having an engaging hole through which said stuffing nozzle is inserted, for engaging in said engaging hole an outer surface of the natural intestine fitted over said stuffing nozzle;

nozzle rotating means for rotating said stuffing nozzle with which the natural intestine has been brought into contact, and which is inserted through the engaging hole of said engaging member; and a stuffing pump for supplying intermittently the stuffing material into said stuffing nozzle so as to discharge intermittently the stuffing material into the natural intestine being stretched and pulled out from a distal end of said stuffing nozzle by the stuffed natural intestine which is conveyed by being pinched by said pincher of said pinching device moving in a forward direction of said nozzle;

a distal end of each of said pincher members being disposed such that a center of movement thereof is located laterally of an axis of said stuffing nozzle, so that the distal ends of said pincher members move from a rearward region located rearwardly of the distal end of said stuffing nozzle to a forward region located forwardly thereof and so that said pincher members pinch the stuffed natural intestine.

28. An apparatus for manufacturing chain-like food products such as sausages or the like according to claim 27, wherein said pincher moving means includes means for moving intermittently said pincher.

29. An apparatus for manufacturing chain-like food products such as sausages or the like according to claim 27, wherein said pincher moving means includes means for moving continuously said pincher.

30. An apparatus for manufacturing chain-like food products such as sausages or the like, comprising:

a stuffing nozzle over which a natural intestine is fitted and which is adapted to discharge a stuffing material continuously into the natural intestine;

a pinching device including a pincher, which is comprised of a pair of pincher members for consecutively pinching a stuffed natural intestine stuffed with the stuffing material, and pincher moving means having a wrapping connector means which is adapted to move continuously and on which said pincher members are disposed at a predetermined interval;

an engaging member having an engaging hole through which said stuffing nozzle is inserted, for engaging in said engaging hole an outer surface of the natural intestine fitted over said stuffing nozzle;

nozzle rotating means for rotating intermittently said stuffing nozzle with which the natural intestine has been brought into contact and which is inserted through the engaging hole of said engaging member; and a stuffing pump for supplying continuously the stuffing material into said stuffing nozzle so as to discharge continuously the stuffing material into the natural intestine being stretched and pulled out from a distal end of said stuffing nozzle by the stuffed natural intestine which is conveyed by being pinched by said pincher of said pinching device moving in a forward direction of said nozzle;

a distal end of each of said pincher members being disposed such that a center of movement thereof is located laterally of an axis of said stuffing nozzle, so that the distal ends of said pincher members move from a rearward region located rearwardly of the distal end of said stuffing nozzle to a forward region located forwardly thereof and so that said pincher members pinch the stuffed natural intestine.

* * * * *

UNITED STATES PATENT AND TRADEMARK OFFICE

CERTIFICATE OF CORRECTION

PATENT NO.     : 6,050,888
DATED          : April 18, 2000
INVENTOR(S)    : NAKAMURA et al It is certified that error appears in the above-identified patent and that said letters patent is hereby corrected as shown below:

On the title page, left-hand column under "[30]" delete "9-35751" and replace by --9-32751--.

Signed and Sealed this

Twenty-seventh Day of March, 2001

Attest:

NICHOLAS P. GODICI

Attesting Officer

Acting Director of the United States Patent and Trademark Office